United States Patent
Jung et al.

(10) Patent No.: US 12,294,815 B2
(45) Date of Patent: May 6, 2025

(54) ELECTRONIC APPARATUS AND CONTROL METHOD THEREOF

(71) Applicant: SAMSUNG ELECTRONICS CO., LTD., Suwon-si (KR)

(72) Inventors: Kyunghwa Jung, Suwon-si (KR); Jeonghye Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 17 days.

(21) Appl. No.: 18/208,150

(22) Filed: Jun. 9, 2023

(65) Prior Publication Data

US 2023/0328209 A1 Oct. 12, 2023

Related U.S. Application Data

(63) Continuation of application No. PCT/KR2022/014681, filed on Sep. 29, 2022.

(30) Foreign Application Priority Data

Sep. 30, 2021 (KR) .................. 10-2021-0129629

(51) Int. Cl.
*H04N 9/31* (2006.01)
(52) U.S. Cl.
CPC ................ *H04N 9/31* (2013.01)
(58) Field of Classification Search
CPC ...... H04N 9/31; H04N 9/3147; H04N 9/3182; H04N 9/3185; H04N 9/3188; H04N 9/3194; H04W 4/023; H04W 4/20; H04W 4/80
See application file for complete search history.

(56) References Cited

U.S. PATENT DOCUMENTS

| | | | | |
|---|---|---|---|---|
| 7,509,124 | B2 * | 3/2009 | O'Neil | H04N 21/2668 713/168 |
| 7,676,219 | B2 * | 3/2010 | Williams | H04L 67/52 380/258 |
| 7,890,087 | B2 * | 2/2011 | O'Neil | H04N 21/23439 713/168 |

(Continued)

FOREIGN PATENT DOCUMENTS

| | | |
|---|---|---|
| CN | 107770758 A | 3/2018 |
| CN | 109451499 A | 3/2019 |

(Continued)

OTHER PUBLICATIONS

International Search Report (PCT/ISA/210) issued Jan. 13, 2023 by the International Searching Authority in International Application No. PCT/KR2022/014681.

(Continued)

*Primary Examiner* — Michael B. Pierorazio
(74) *Attorney, Agent, or Firm* — Sughrue Mion, PLLC

(57) ABSTRACT

A control method of an electronic apparatus includes identifying whether an external device is located within a reference radius of the electronic apparatus; based on the external device being located within the reference radius, obtaining distance information between the identified external device and the electronic apparatus; identifying a standby time based on the distance information; and based on the standby time elapsing, performing connection with the external device.

16 Claims, 16 Drawing Sheets

(56) References Cited

U.S. PATENT DOCUMENTS

| | | | | |
|---|---|---|---|---|
| 8,081,957 B2* | 12/2011 | O'Neil | | H04N 21/2668 |
| | | | | 713/168 |
| 8,255,378 B2* | 8/2012 | Ji | | H04H 60/70 |
| | | | | 707/706 |
| 8,346,230 B2* | 1/2013 | Goodmon | | H04W 4/029 |
| | | | | 455/414.3 |
| 8,370,872 B1* | 2/2013 | Sun | | H04N 21/41407 |
| | | | | 725/38 |
| 8,423,004 B2* | 4/2013 | Goodmon | | H04L 63/107 |
| | | | | 455/414.3 |
| 8,644,354 B2* | 2/2014 | George | | H04M 1/72415 |
| | | | | 725/74 |
| 8,737,990 B2* | 5/2014 | Moreillon | | H04N 21/41407 |
| | | | | 455/410 |
| 9,277,576 B2 | 3/2016 | Ko et al. | | |
| 9,635,499 B2 | 4/2017 | Ko et al. | | |
| 9,691,358 B2 | 6/2017 | Park et al. | | |
| 9,832,502 B1* | 11/2017 | Goetz | | H04N 21/4524 |
| 10,244,570 B2 | 3/2019 | Ko et al. | | |
| 10,326,961 B2 | 6/2019 | Kim et al. | | |
| 10,485,041 B1 | 11/2019 | Ko et al. | | |
| 10,685,624 B2 | 6/2020 | Park et al. | | |
| 10,735,785 B1* | 8/2020 | Hamrick, Jr. | | H04N 21/411 |
| 10,805,656 B1* | 10/2020 | Jackson | | H04N 21/64322 |
| 10,813,151 B2 | 10/2020 | Ko et al. | | |
| 10,863,435 B2 | 12/2020 | Cho et al. | | |
| 2003/0097408 A1* | 5/2003 | Kageyama | | H04L 12/1818 |
| | | | | 709/205 |
| 2003/0192054 A1* | 10/2003 | Birks | | H04N 21/2343 |
| | | | | 725/100 |
| 2003/0233580 A1* | 12/2003 | Keeler | | G06Q 20/382 |
| | | | | 726/29 |
| 2005/0097593 A1* | 5/2005 | Raley | | H04N 21/44224 |
| | | | | 348/E7.069 |
| 2006/0031889 A1* | 2/2006 | Bennett | | H04N 21/41265 |
| | | | | 348/E7.071 |
| 2006/0064734 A1* | 3/2006 | Ma | | H04N 21/812 |
| | | | | 725/136 |
| 2006/0253560 A1* | 11/2006 | Aaltonen | | H04H 60/06 |
| | | | | 709/223 |
| 2007/0067807 A1* | 3/2007 | O'Neil | | H04N 21/23439 |
| | | | | 348/E7.071 |
| 2007/0067817 A1* | 3/2007 | Hamilton | | H04N 21/6334 |
| | | | | 348/E7.075 |
| 2007/0107022 A1* | 5/2007 | Lawrence, III | | H04N 21/44222 |
| | | | | 725/86 |
| 2007/0157234 A1* | 7/2007 | Walker | | H04N 21/4532 |
| | | | | 725/38 |
| 2007/0237330 A1* | 10/2007 | Srivastava | | H04N 21/6408 |
| | | | | 348/E7.071 |
| 2007/0240192 A1* | 10/2007 | Acharya | | H04N 21/6408 |
| | | | | 348/E7.071 |
| 2008/0005770 A1* | 1/2008 | Acharya | | H04N 21/6587 |
| | | | | 348/E7.071 |
| 2008/0060035 A1* | 3/2008 | Tsang | | H04N 21/222 |
| | | | | 725/109 |
| 2008/0114880 A1* | 5/2008 | Jogand-Coulomb | | H04L 63/10 |
| | | | | 709/227 |
| 2008/0184326 A1* | 7/2008 | Nakajima | | H04N 5/782 |
| | | | | 725/38 |
| 2008/0201225 A1* | 8/2008 | Maharajh | | H04M 15/53 |
| | | | | 707/999.102 |
| 2008/0216107 A1* | 9/2008 | Downey | | H04N 21/44224 |
| | | | | 725/25 |
| 2008/0235733 A1* | 9/2008 | Heie | | H04N 21/482 |
| | | | | 725/46 |
| 2008/0270725 A1* | 10/2008 | Roden | | H04N 21/2743 |
| | | | | 711/E12.001 |
| 2008/0307478 A1* | 12/2008 | Kim | | H04L 65/1059 |
| | | | | 725/114 |
| 2009/0113489 A1* | 4/2009 | O'Neil | | H04N 21/41407 |
| | | | | 725/62 |
| 2010/0022188 A1 | 1/2010 | Nakagawa | | |
| 2010/0180305 A1* | 7/2010 | Migos | | H04N 21/4623 |
| | | | | 345/173 |
| 2010/0199316 A1* | 8/2010 | Clarniello | | H04W 12/08 |
| | | | | 725/62 |
| 2010/0296487 A1* | 11/2010 | Karaoguz | | H04W 36/04 |
| | | | | 370/332 |
| 2010/0299264 A1* | 11/2010 | Berger | | G06Q 30/0601 |
| | | | | 705/59 |
| 2011/0086619 A1* | 4/2011 | George | | H04M 1/72415 |
| | | | | 455/414.1 |
| 2011/0099587 A1* | 4/2011 | O'Neil | | H04N 21/25825 |
| | | | | 725/62 |
| 2011/0119595 A1* | 5/2011 | Bydeley | | H04N 21/6125 |
| | | | | 725/112 |
| 2011/0137592 A1* | 6/2011 | Kim | | G01R 21/1338 |
| | | | | 702/62 |
| 2011/0196983 A1* | 8/2011 | Goodmon | | H04H 60/58 |
| | | | | 709/231 |
| 2011/0279311 A1* | 11/2011 | Hamano | | G06F 16/24575 |
| | | | | 707/769 |
| 2011/0298596 A1* | 12/2011 | Warrick | | H04N 21/414 |
| | | | | 340/12.53 |
| 2011/0302607 A1* | 12/2011 | Warrick | | H04N 21/41265 |
| | | | | 725/39 |
| 2012/0127374 A1* | 5/2012 | Kanojia | | H04H 60/82 |
| | | | | 348/731 |
| 2012/0192234 A1* | 7/2012 | Britt | | H04N 21/4882 |
| | | | | 725/98 |
| 2012/0266201 A1* | 10/2012 | Kanojia | | H04N 21/2187 |
| | | | | 725/109 |
| 2012/0317596 A1* | 12/2012 | O'Neil | | H04N 21/25825 |
| | | | | 725/25 |
| 2013/0127665 A1* | 5/2013 | Miller | | H01Q 1/42 |
| | | | | 342/359 |
| 2013/0198787 A1* | 8/2013 | Perry | | H04N 21/2585 |
| | | | | 725/86 |
| 2013/0227708 A1* | 8/2013 | Goodmon | | H04L 67/52 |
| | | | | 726/27 |
| 2013/0276017 A1* | 10/2013 | Walker | | H04N 21/4524 |
| | | | | 725/31 |
| 2014/0013342 A1* | 1/2014 | Swan | | H04N 21/4821 |
| | | | | 725/92 |
| 2014/0073244 A1* | 3/2014 | Ko | | H04L 69/14 |
| | | | | 455/41.1 |
| 2014/0096163 A1* | 4/2014 | Perry, II | | H04W 4/06 |
| | | | | 725/74 |
| 2014/0167929 A1* | 6/2014 | Shim | | G08C 17/02 |
| | | | | 340/12.5 |
| 2015/0062048 A1 | 3/2015 | Park et al. | | |
| 2015/0230004 A1* | 8/2015 | VanDuyn | | H04N 21/2541 |
| | | | | 725/27 |
| 2016/0020861 A1* | 1/2016 | Jin | | H04W 4/023 |
| | | | | 455/456.1 |
| 2016/0066125 A1* | 3/2016 | Cho | | H04W 4/80 |
| | | | | 455/41.2 |
| 2016/0150358 A1 | 5/2016 | Ko et al. | | |
| 2017/0026607 A1 | 1/2017 | Kim et al. | | |
| 2017/0202045 A1 | 7/2017 | Ko et al. | | |
| 2017/0243563 A1 | 8/2017 | Park et al. | | |
| 2018/0035146 A1* | 2/2018 | Goetz | | H04N 21/266 |
| 2018/0249409 A1 | 8/2018 | Cho et al. | | |
| 2018/0359529 A1* | 12/2018 | Hasek | | G06F 3/0482 |
| 2019/0208559 A1 | 7/2019 | Ko et al. | | |
| 2019/0373658 A1 | 12/2019 | Ko et al. | | |
| 2020/0084486 A1* | 3/2020 | Cho | | H04N 21/8456 |
| 2020/0213637 A1* | 7/2020 | Swan | | H04N 21/41265 |
| 2020/0314495 A1* | 10/2020 | Wittke | | H04N 21/4532 |
| 2020/0359077 A1* | 11/2020 | Das | | H04N 21/4826 |
| 2020/0384951 A1* | 12/2020 | Preradovic | | H04W 4/40 |
| 2021/0029402 A1* | 1/2021 | Das | | H04N 21/64322 |
| 2021/0037581 A1 | 2/2021 | Ko et al. | | |
| 2021/0195334 A1* | 6/2021 | Girardier | | H04W 56/001 |
| 2021/0235366 A1 | 7/2021 | Harbour et al. | | |
| 2021/0321148 A1* | 10/2021 | Swan | | H04N 21/2343 |

(56) References Cited

U.S. PATENT DOCUMENTS

| | | | |
|---|---|---|---|
| 2022/0006945 A1* | 1/2022 | Bathija | H04N 23/90 |
| 2022/0124471 A1* | 4/2022 | Chen | H04L 1/1874 |
| 2022/0124553 A1* | 4/2022 | Chen | H04L 1/203 |

FOREIGN PATENT DOCUMENTS

| | | |
|---|---|---|
| CN | 111884889 A | 11/2020 |
| CN | 113064683 A | 7/2021 |
| EP | 3407133 A1 | 11/2018 |
| JP | 2016-177132 A | 10/2016 |
| JP | 2018-36933 A | 3/2018 |
| KR | 10-1339835 B1 | 12/2013 |
| KR | 10-1692909 B1 | 1/2017 |
| KR | 10-1855938 B1 | 5/2018 |
| KR | 10-2018-0098051 A | 9/2018 |
| KR | 10-1974820 B1 | 8/2019 |
| KR | 10-2180479 B1 | 11/2020 |
| KR | 10-2220825 B1 | 3/2021 |

OTHER PUBLICATIONS

Written Opinion (PCT/ISA/237) issued Jan. 13, 2023 by the International Searching Authority in International Application No. PCT/KR2022/014681.

Communication issued on Aug. 16, 2024 by the European Patent Office in European Patent Application No. 22876911.3.

* cited by examiner

ELECTRONIC APPARATUS AND CONTROL METHOD THEREOF

CROSS-REFERENCE TO RELATED APPLICATIONS

This application is a continuation of International Application No. PCT/KR2022/014681 designating the United States, filed on Sep. 29, 2022, in the Korean Intellectual Property Receiving Office and claiming priority to Korean Patent Application No. 10-2021-0129629 filed on Sep. 30, 2021 in the Korean Intellectual Property Office. The disclosures of each of these applications are incorporated by reference herein in their entireties.

BACKGROUND

1. Field

The disclosure relates to an electronic apparatus and a control method thereof. More particularly, the disclosure relates to an electronic apparatus performing connection with an external device and a control method thereof.

2. Description of Related Art

Recently, electronic apparatuses with various optical output functions are under development, and examples such electronic apparatuses may include a display device, a lighting device, a mobile communication device, a projector device, or the like.

Related art electronic apparatuses are able to connect with external devices only when performing a series of operations through a user interface (UI) provided in a screen image provided by the electronic apparatus.

With the recent development and miniaturization of projector devices which enlarge and project output light output from a light source onto a wall or a screen through a projection lens, there may be instances in which an electronic apparatus with an optical output function is located near a user, and there is growing need for increasing convenience of connection between the electronic apparatus described above with the external device of the user.

SUMMARY

Provided are an electronic device which performs connection with an external device based on distance information between the external device and the electronic apparatus and a control method thereof.

According to an aspect of the disclosure, a control method of an electronic apparatus includes: identifying whether an external device is located within a reference radius of the electronic apparatus; based on the external device being located within the reference radius, obtaining distance information between the identified external device and the electronic apparatus; identifying a standby time based on the distance information; and based on the standby time elapsing, performing connection with the external device.

The identifying the standby time may include: based on the distance information indicating that a distance between the electronic apparatus and the external device is a first distance, identifying a first time as the standby time; and based on the distance information indicating that the distance between the electronic apparatus and the external device is a second distance, which is greater than the first distance, identifying a second time longer than the first time as the standby time.

The identifying the standby time may include: based on the distance information indicating that a distance between the electronic apparatus and the external device is a first distance, identifying a first time as the standby time; increasing the first time based on an increased distance between the electronic apparatus and the external device, such that the electronic apparatus and the external device become farther apart than the first distance; and decreasing the first time based on a decreased distance between the electronic apparatus and the external device, such that the electronic apparatus and the external device become becoming closer than the first distance.

The control method may further include, based on the increased distance between the electronic apparatus and the external device becoming farther apart by the reference radius or more, controlling to not perform the connection with the external device.

The performing the connection with the external device may include, based on the external device being located within the reference radius, controlling a projector to project information corresponding to the standby time.

The control method may further include: based on the increased distance between the external device and the electronic apparatus, controlling the projector to project information notifying that the standby time for performing the connection with the external device is increased; and based on a decreased distance between the external device and the electronic apparatus, controlling the projector to project information notifying that the standby time for performing the connection with the external device is decreased.

The identifying the external device may include identifying a plurality of external devices located within the reference radius; and identifying one of the plurality of external devices, which is closest to the electronic apparatus as the external device to perform the connection with the electronic apparatus.

The identifying the external device may include identifying a plurality of external devices located within the reference radius; and identifying one of the plurality of external devices with a history of having performed connection with the electronic apparatus as the external device to perform the connection with the electronic apparatus.

The identifying the external device may include identifying the external device located within the reference radius with the electronic apparatus through a Bluetooth Low Energy (BLE) method.

The obtaining the distance information may include obtaining, by using at least one from among a Bluetooth Low Energy (BLE) method and a Time of Flight (ToF) sensor, the distance information between the identified external device and the electronic apparatus.

According to an aspect of the disclosure, an electronic apparatus includes: a memory configured to store at least one instruction; a communication interface; and a processor configured to execute the at least one instruction to: identify whether an external device is located within a reference radius of the electronic apparatus, based on the external device being located within the reference radius, obtain distance information between the identified external device and the electronic apparatus, identify a standby time based on the distance information, and based on the standby time elapsing, control the communication interface to perform connection with the external device.

The processor may be further configured to execute the at least one instruction to: based on the distance information indicating that a distance between the electronic apparatus and the external device is a first distance, identify a first time as the standby time, and based on the distance information indicating that the distance between the electronic apparatus and the external device is a second distance, which is greater than the first distance, identify a second time longer than the first time as the standby time.

The processor may be further configured to execute the at least one instruction to: based on the distance information indicating that a distance between the electronic apparatus and the external device is a first distance, identify a first time as the standby time, increase the first time based on an increased distance between the electronic apparatus and the external device, such that the electronic apparatus and the external device become farther apart than the first distance, and decrease the first time based on a decreased distance between the electronic apparatus and the external device, such that the electronic apparatus and the external device become becoming closer than the first distance.

The processor may be further configured to execute the at least one instruction to, based on the increased distance between the electronic apparatus and the external device becoming farther apart by the reference radius or more, control the communication interface to not perform the connection with the external device.

The electronic apparatus may further include a projector configured to project a projection image, wherein the processor may be further configured to execute the at least one instruction to, based on the external device being located within the reference radius, control the projector to project information corresponding to the standby time.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
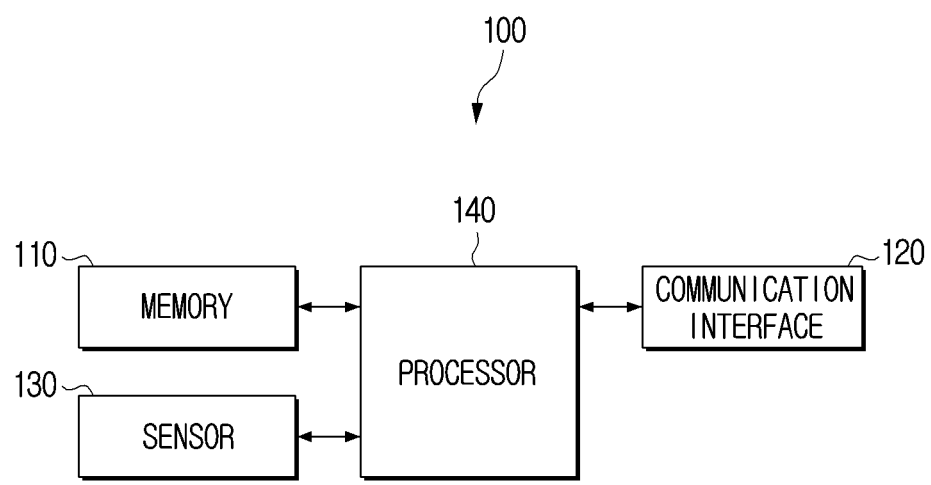
FIG. 1 is a block diagram illustrating an electronic apparatus according to an embodiment.

FIG. 1 is a block diagram illustrating an electronic apparatus according to an embodiment.

Referring to FIG. 1, the electronic apparatus 100 may include a memory 110, a communication interface 120, a sensor 130, and a processor 140.

According to an embodiment of the disclosure, the electronic apparatus 100 may be implemented as an electronic apparatus of various forms such as, for example, and without limitation, a smart phone, an augmented reality (AR) glass, a tablet personal computer (PC), a mobile phone, a video phone, an e-book reader, a television (TV), a desktop PC, a laptop PC, a netbook computer, a workstation, a camera, a smart watch, a projector device, or the like. However, embodiments are not limited to the above-described configuration, and some configurations may be added or omitted according to a type of the electronic apparatus.

The memory 110 may store at least one instruction or data associated with at least one other element of the electronic device 100. Specifically, the memory 110 may be implemented as a non-volatile memory, a volatile memory, a flash-memory, a hard disk drive (HDD), a solid state drive (SSD), or the like. The memory 110 may be accessed by the processor 140, and reading, writing, modifying, deleting and/or updating of data by the processor 140 may be performed.

According to an embodiment, the term memory may include the memory 110, a read only memory (ROM) in the processor 140, a random access memory (RAM), or a memory card (e.g., a micro SD card, a memory stick) mounted to the electronic device 100. In addition, the memory 110 may be stored with programs, data, or the like for configuring various screen images to be displayed in a display area of a display. As described above, the memory 110 may be configured to store at least one instruction. Here, the instruction may be for controlling the electronic apparatus 100.

The communication interface 120 may be a configuration capable of performing communication with the external device. The communication interface 120 being communicatively coupled with the external device may include communicating through a third device (e.g., a relay, a hub, an access point, a server, or a gateway, etc.). The wireless communication may include a cellular communication which uses at least one from among, for example, and without limitation, a long term evolution (LTE), an LTE advance (LTE-A), a code division multiple access (CDMA), a wideband CDMA (WCDMA), a universal mobile telecommunications system (UMTS), a wireless broadband (WiBro), a global system for mobile communications (GSM), or the like. According to an embodiment, the wireless communication may include at least one from among, for example, and without limitation, wireless fidelity (WiFi), Wi-Fi Direct, Bluetooth, Bluetooth low energy (BLE), ZigBee, near field communication (NFC), magnetic secure transmission, radio frequency (RF) or body area network (BAN). The wired communication may include at least one from among, for example, and without limitation, a universal serial bus (USB), a high definition multimedia interface (HDMI), a recommended standard 232 (RS-232), a power line communication (PLC), plain old telephone service (POTS), or the like. A network in which the wireless communication or the wired communication is performed may include a telecommunication network, for example, at least one from among a computer network (e.g., local area network (LAN) or wide area network (WAN)), the Internet, or a telephone network.

Specifically, the communication interface 120 may be configured to identify the external device located within a reference radius of the electronic apparatus 100 using the Bluetooth Low Energy method. According to an embodiment, the reference radium is a pre-set or predetermined radius. Here, the external device may be various configurations capable of performing connection with the electronic apparatus 100 such as, for example, and without limitation, a smart phone, an AR glass, a tablet PC, a mobile phone, a video phone, an e-book reader, a camera, a smart watch, a projector device, or the like. In this case, the communication interface 120 may be configured to obtain distance information between the electronic apparatus 100 and the external device based on a size of a signal received from the external device in the Bluetooth Low Energy method.

The sensor 130 may include a structure configured to obtain distance information between the external device and the electronic apparatus 100. According to an embodiment, the sensor 130 may include a plurality of sensors.

According to an embodiment, the sensor 130 may include a Time of Flight (ToF) sensor. The ToF sensor may be configured to obtain spatial information, distance information, and movement information of an object by calculating a distance of light which is projected to an object through infrared wavelengths and returned by being reflected.

According to an embodiment, the sensor 130 may be configured as one ToF sensor and obtain distance information on the external device located within the pre-set radius (e.g., 90-degree, 120-degree, 150-degree, 180-degree, etc.) from the front of the electronic apparatus (e.g., based on the electronic apparatus being a projector device, a direction at which an image is projected).

According to an embodiment, the sensor 130 may be configured as a plurality of ToF sensors and obtain distance information on the external device at a 360-degree periphery of the electronic apparatus 100.

According to an embodiment, the sensor 130 may be configured as one ToF sensor capable of rotating, and in this case, the one ToF sensor may be configured to obtain distance information on the external device at the periphery of the electronic apparatus 100 by rotating 360-degrees.

According to an embodiment, the sensor 130 may include, in addition to the ToF sensor, at least one from among an image sensor, a distance sensor and a light detection and ranging (LiDAR) sensor which captures an image, and obtain distance information between the external device and the electronic apparatus 100 through various sensors.

The processor 140 may be electrically coupled with the memory 110 and control the overall operation and functions of the electronic apparatus 100. The processor 140 may be configured with one or a plurality of processors. The one or plurality of processors may be a generic-purpose processor such as a central processing unit (CPU) or an application processor (AP), a graphics dedicated processor such as a graphics processing unit (GPU) or a visual processing unit (VPU), or an artificial intelligence dedicated processor such as a neural processing unit (NPU). The one or plurality of processors may control for the input data to be processed according to a pre-defined operation rule or an artificial intelligence model stored in the memory 120. Alternatively, if the one or plurality of processors is an artificial intelligence dedicated processor, the artificial intelligence dedicated processor may be designed to a hardware structure specializing in the processing of a specific artificial intelligence model.

The processor 140 may be configured to control hardware or software elements coupled to the processor 140 by operating an operating system or an application program, and perform various data processing and operations. In addition, the processor 140 may be configured to load and process instructions or data received from at least one from among other elements to the volatile memory, and store the various data in the non-volatile memory.

The processor 140 may be configured to control the overall operation and functions of the electronic apparatus 100 electrically coupled with the memory 110. The processor 140 may be configured to identify, by executing at least one instruction stored in the memory 110, whether the external device is located within the pre-set radius of the electronic apparatus. Specifically, the processor 140 may be configured to identify whether the external device is located within the pre-set radius (e.g., first radius (e.g., radius of 1 m)) with the electronic apparatus 100 through the Bluetooth Low Energy method of the communication interface 120. However, embodiments are not limited thereto, and the processor 1140 may be configured to identify whether the external device is located within the pre-set radius (e.g., radius of 1 m) with the electronic apparatus 100 through various configurations (e.g., image sensor, etc.) of the sensor 130 which is capable of identifying whether the external device may be located within the pre-set radius (e.g., radius of 1 m) with the electronic apparatus 100.

In an embodiment, based on the external device located within the pre-set radius being in plurality, the processor 140 may be configured to identify the external device close in distance with the electronic apparatus 100 as the external device to perform connection with the electronic apparatus 100. In an embodiment, based on the external device located within the pre-set radius being in plurality, the processor 140 may be configured to identify the external device with a history of performing connection with the electronic apparatus 100 as the external device to perform connection with the electronic apparatus 100. An embodiment with respect to the above will be described below through FIGS. 3A and 3B.

Further, based on the external device being located within the pre-set radius, the processor 140 may be configured to obtain distance information between the identified external device and the electronic apparatus.

In an embodiment, the processor 140 may be configured to obtain distance information between the electronic apparatus 100 and the external device based on a signal strength of the external device received through the Bluetooth Low Energy method of the communication interface 120. That is, the signal strength of the external device received through the Bluetooth Low Energy method may vary according to the distance of the electronic apparatus 100 and the external device. That is, the signal strength received through the Bluetooth Low Energy method from the external device located closely with the electronic apparatus 100 may be greater than the signal strength received through the Bluetooth Low Energy method from the external device which is located far from the electronic apparatus 100.

In an embodiment, the processor 140 may be configured to obtain distance information between the electronic apparatus 100 and the external device through the ToF sensor of the sensor 130. Specifically, based on the external device being located within the pre-set radius, the processor 140 may be configured to identify an object detected within the pre-set radius through the ToF sensor of the sensor 130 as the external device. Then, the processor 140 may be configured to obtain distance information between the electronic apparatus 100 and the external device obtained through the ToF sensor of the sensor 130.

In an embodiment, the processor 140 may be configured to obtain distance information between the electronic apparatus 100 and the external device by using the Bluetooth Low Energy method of the communication interface 120 and the ToF sensor of the sensor part 130 together.

However, the embodiment is not limited thereto, and distance information between the electronic apparatus 100 and the external device may be obtained through various configurations capable of obtaining distance information with the external device located within the pre-set radius from the electronic apparatus 100.

Further, the processor 140 may be configured to identify a standby time for beginning connection with the external device based on distance information between the electronic apparatus 100 and the external device. That is, based on the identified standby time being elapsed, the processor 140 may be configured to control the communication interface 120 to perform connection with the external device.

In an embodiment, the standby time for beginning connection with the external device may vary according to a distance between the electronic apparatus 100 and the external device. That is, based on the distance between the electronic apparatus and the external device being a first distance through distance information between the electronic apparatus 100 and the external device, the standby time may be a first time. Further, based on the distance between the electronic apparatus and the external device being a second distance which is further than the first distance through distance information between the electronic apparatus 100 and the external device, the standby time may be a second time which is longer than the first time. Further, based on the distance between the electronic apparatus and the external device being a third distance which is closer than the first distance through distance information between the electronic apparatus 100 and the external device, the standby time may be a third time which is shorter than the first time.

In an embodiment, the standby time for beginning connection with the external device may vary according to a change in distance between the electronic apparatus 100 and the external device. That is, the standby time for beginning connection with the external device may be the same regardless of the initial distance between the electronic apparatus 100 and the external device, but may vary according to the change in distance between the electronic apparatus 100 and the external device which is changed from the initial distance between the electronic apparatus 100 and the external device.

Specifically, based on the external device being located within the pre-set radius, the processor 140 may be configured to identify the standby time as a pre-set time (e.g., 5 seconds). Further, the processor 140 may be configured to obtain distance information between the electronic apparatus 100 and the external device by continuing prior to the standby time elapsing, and identify the change in distance between the electronic apparatus 100 and the external device. Further, based on the distance between the electronic apparatus and the external device becoming closer from the initial distance through distance information, the processor 140 may be configured to decrease the standby time than the pre-set time (e.g., 3 seconds). Further, based on the distance between the electronic apparatus 100 and the external device becoming farther apart from the initial distance through distance information, the processor 140 may be configured to increase the standby time than the pre-set time (e.g., 10 seconds). Further, the processor 140 may be configured to control the communication interface 120 to not perform connection with the external device, based on the distance between the electronic apparatus 100 and the external device becoming farther apart by a second radius or more through distance information. Here, the second radius may be the same radius of the first radius (e.g., radius of 1 m) as described above, but embodiments are not limited thereto and may be farther or closer than the first radius.

In an embodiment, the standby time for beginning connection with the external device may vary according to the initial distance between the electronic apparatus 100 and the external device, and may vary according to the change in distance between the electronic apparatus 100 and the external device which is changed from the initial distance between the electronic apparatus 100 and the external device. That is, based on the distance between the electronic apparatus and the external device being the first distance through distance information between the electronic apparatus 100 and the external device, the standby time may be the first time. Further, based on the distance between the electronic apparatus and the external apparatus being changed to the second distance which is farther apart than the first distance prior to the first time elapsing, the processor 140 may be configured to change the standby time to the second time which is longer than the first time.

Further, based on the standby time elapsing, the processor 140 may be configured to control the communication interface 120 to perform connection with the external device. Here, the electronic apparatus 100 and the external device may perform connection through various connection methods (e.g., WiFi direct, Bluetooth, etc.) of the communication interface 120.

Further, the processor 140 may be configured to provide information corresponding to the standby time from a time point at which the external device is identified to until the standby time is elapsed.

In an embodiment, based on the electronic apparatus 100 being a projector device including a projector projecting an image, the processor 140 may be configured to control the projector to project first information corresponding to the standby time based on the external device being located within the pre-set radius. Here, the first information may be a UI notifying that an external device has been detected, and that the standby time for performing connection with the external device is elapsing.

After the first information is projected, the processor 140 may be configured to control the projector to project second information notifying that the standby time for performing connection with the external device is being elapsed. Here, the second information may be a UI notifying that the standby time is being elapsed.

Further, based on the distance between the electronic apparatus 100 and the external device becoming closer based on distance information between the electronic apparatus 100 and the external device, the processor 140 may be configured to control the projector to project third information notifying that the standby time for performing connection with the external device is decreased. Here, the third information may be a UI notifying that the standby time is decreased and that the decreased standby time is elapsed.

Further, based on the distance between the electronic apparatus 100 and the external device becoming farther apart based on distance information between the electronic apparatus 100 and the external device, the processor 140 may be configured to control the projector to project fourth information notifying that the standby time for performing connection with the external device is increased. Here, the fourth information may be a UI notifying that the standby time is increased and that the increased standby time is being elapsed. In addition, as an example, based on the distance between the electronic apparatus 100 and the external device becoming farther apart, the processor 140 may be configured to control the projector to project operation information for not performing connection with the external device with the third information. According to an embodiment, the operation information may indicate that the connection may not be performed if the mobile device (or the external device) is shaken. Further, information corresponding to the standby time will be described below through FIGS. 6A, 6B, 7A and 7B.

In an embodiment, based on the electronic apparatus 100 being a display device including a display, the processor 140 may be configured to control the display to display first information corresponding the standby time based on the external device being located within the pre-set radius. Further, based on the distance between the electronic apparatus 100 and the external device becoming closer based on distance information between the electronic apparatus 100 and the external device, the processor 140 may be configured to control the display to display second information notifying that the standby time for performing connection with the external device is decreased. Further, based on the distance between the electronic apparatus 100 and the external device becoming farther apart based on distance information between the electronic apparatus 100 and the external device, the processor 140 may be configured to control the display to display third information notifying that the standby time for performing connection with the external device is increased.

Figure 2A:
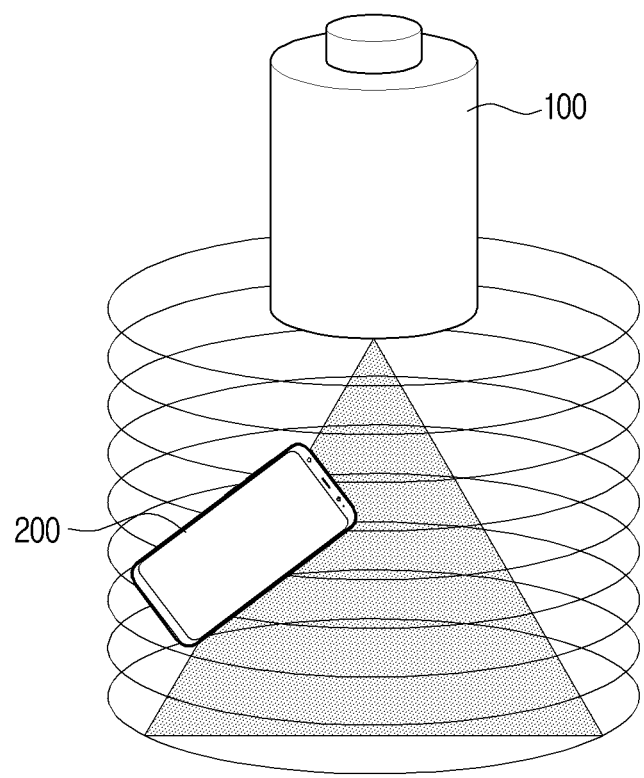
FIG. 2A is a diagram illustrating an example of connecting an electronic apparatus installed to a ceiling with an external device according to an embodiment.

FIG. 2A is a diagram illustrating an example of connecting an electronic apparatus installed to a ceiling with an external device according to an embodiment.

According to the disclosure, the electronic apparatus 100 may be implemented as a projector device installed on a ceiling, a wall, or the like as in FIG. 2A projecting a projection image. In an example, the electronic apparatus 100 may be supplied with power by being connected with a socket receiving groove of an external lighting device which is installed on the ceiling or the wall, and the embodiment will be described below through FIG. 12.

The electronic apparatus 100 may identify whether the external device 200 is located within a specific radius of the electronic apparatus 100 or within a specific distance from the electronic apparatus 100. Specifically, the electronic apparatus 100 may identify whether the external device 200 is located within the pre-set radius (e.g., radius of 1 m) with the electronic apparatus 100 through the Bluetooth Low Energy method.

Further, based on the external device 200 being identified as located within the pre-set radius, the electronic apparatus 100 may obtain distance information between the external device 200 and the electronic apparatus 100 through information on the external device 200 which is obtained through the signal strength of the external device 200 and the ToF sensor received through the Bluetooth Low Energy method. That is, based on the electronic apparatus 100 which projects the projection image being installed on the ceiling, the wall, or the like, the electronic apparatus 100 may obtain distance information between the external device 200 and the electronic apparatus 100 by further using the ToF sensor because the ToF sensor in the electronic apparatus 100 is provided toward a projection direction.

Based on distance information between the external device 200 and the electronic apparatus 100 being obtained, the electronic apparatus 100 may identify the standby time for beginning connection with the external device 200 based on the distance information. Further, based on the standby time being elapsed, the electronic apparatus 100 may perform connection with the external device. In an example, the standby time may be increased or decreased according to the change in distance between the external device 200 and the electronic apparatus 100 which is obtained based on the distance information.

Figure 2B:
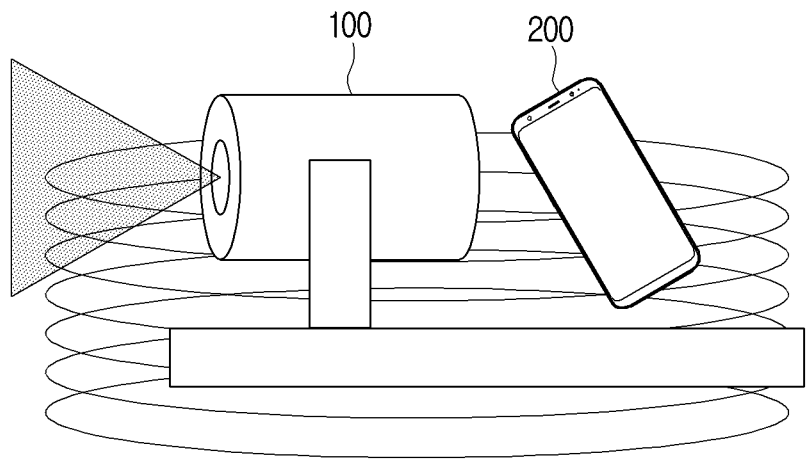
FIG. 2B is a diagram illustrating an example of connecting an electronic apparatus located at a surface with an external device according to an embodiment.

FIG. 2B is a diagram illustrating an embodiment of connecting an electronic apparatus located at a surface with an external device according to an embodiment.

According to the disclosure, the electronic apparatus 100 may be implemented as a projector device projecting a projection image by being located at a surface of a table, a floor, or the like as in FIG. 2B. In this case, the electronic apparatus 100 may identify whether the external device 200 is located within the pre-set radius of the electronic apparatus 100. Specifically, the electronic apparatus 100 may identify whether the external device 200 is located within the pre-set radius (e.g., first radius (e.g., radius of 1 m)) with the electronic apparatus 100 through the Bluetooth Low Energy method.

Further, based on the external device 200 being identified as located within the pre-set radius, the electronic apparatus 100 may obtain distance information between the external device 200 and the electronic apparatus 100 through the signal strength of the external device 200 which is received through the Bluetooth Low Energy method. That is, based on the electronic apparatus 100 which projects a projection image being located at the surface of the table, the floor, or the like, because the ToF sensor in the electronic apparatus 100 is provided to face the projection direction, the electronic apparatus 100 may not be able to detect the external device within the pre-set radius of the electronic apparatus 100 through the ToF sensor due to the limitation in a field of view of the ToF sensor. Accordingly, the electronic apparatus 100 may obtain distance information between the external device 200 and the electronic apparatus 100 through a Bluetooth (Bluetooth Low Energy) method. However, embodiments are not limited thereto, and based on the ToF sensor in the electronic apparatus 100 being implemented in plurality, or implemented to be rotatable capable of detecting a 360-degree range, the electronic apparatus 100 may obtain distance information between the electronic apparatus 100 and the external device 200 by further using the ToF sensor.

Based on distance information between the external device 200 and the electronic apparatus 100 being obtained, the electronic apparatus 100 may identify the standby time for beginning connection with the external device 200 based on the distance information. Further, based on the standby time being elapsed, the electronic apparatus 100 may perform connection with the external device. In an example, the standby time may be increased or decreased according to the change in distance between the external device 200 and the electronic apparatus 100 which is obtained based on the distance information.

Figure 3A:
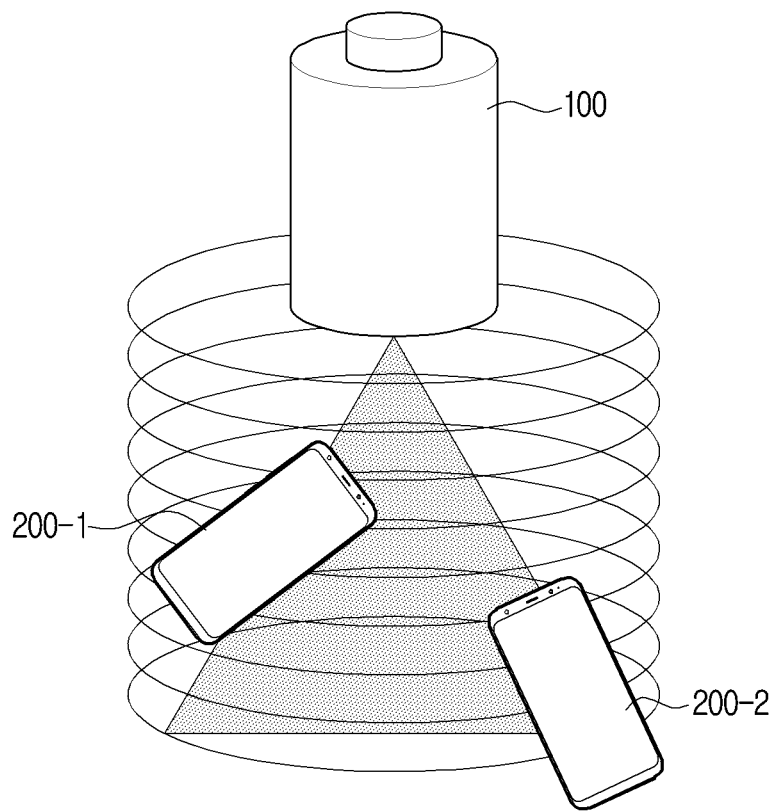
FIG. 3A is a diagram illustrating an example of connecting an electronic apparatus installed on a ceiling with an external devices, from among a plurality of external devices according to an embodiment.

FIG. 3A is a diagram illustrating an example of connecting an electronic apparatus installed on a ceiling with one from among a plurality of external devices according to an embodiment.

According to an embodiment, the electronic apparatus 100 may be implemented as a projector device projecting a projection image by being installed at the ceiling, the wall, or the like, as in FIG. 3A. In this case, the electronic apparatus 100 may identify whether the external device is located within the pre-set radius of the electronic apparatus 100. Specifically, the electronic apparatus 100 may identify whether the external device is located within the pre-set radius (e.g., first radius (radius of 1 m)) with the electronic apparatus 100 through the Bluetooth Low Energy method.

In an embodiment, based on a plurality of external devices 200-1 and 200-2 being identified as located within the pre-set radius of the electronic apparatus 100 through the Bluetooth Low Energy method as in FIG. 3A, the electronic apparatus 100 may identify the external device close in distance with the electronic apparatus 100 as the external device to perform connection with the electronic apparatus 100. In an example, the electronic apparatus 100 may obtain distance information between the plurality of external devices 200-1 and 200-2 and the electronic apparatus 100 through the signal strength of the plurality of external devices 200-1 and 200-2 received through the Bluetooth Low Energy method. Further, the electronic apparatus 100 may identify the external device 200-1 close in distance with the electronic apparatus 100 as the external device to perform connection with the electronic apparatus 100 from among the plurality of external devices 200-1 and 200-2.

In an embodiment, based on the plurality of external devices 200-1 and 200-2 being identified as located within the pre-set radius of the electronic apparatus 100 through the Bluetooth Low Energy method as in FIG. 3A, the electronic apparatus 100 may identify the external device with a history of having performed connection with the electronic apparatus 100 as the external device to perform connection with the electronic apparatus 100 from among the plurality of external devices 200-1 and 200-2. For example, based on a second external device 200-2, from among the plurality of external devices 200-1 and 200-2 having history of previously performing connection with the electronic apparatus 100, but a first external device 200-1 having no history of previously performing connection with the electronic apparatus 100, the electronic apparatus 100 may identify the second external device 200-2 as the external device to perform connection with the electronic apparatus 100 from among the plurality of external devices 200-1 and 200-2.

That is, based on the plurality of external devices 200-1 and 200-2 being identified as located within the pre-set radius of the electronic apparatus 100, the electronic apparatus 100 may identify the external device, among the plurality of external devices 200-1 and 200-2, closer to the electronic apparatus 100 or the external device with a history of previously having performed connection with the electronic apparatus 100 as the external device to perform connection with the electronic apparatus 100 based on a setting by the user.

Further, the electronic apparatus 100 may identify the standby time for beginning connection with the external device 200 based on distance information with the external device 200-1. Further, based on the standby time elapsing, the electronic apparatus 100 may perform connection with the external device. In an example, the standby time may be increased or decreased according to the change in distance between the external device 200-1 and the electronic apparatus 100 which is obtained based on the distance information.

Figure 3B:
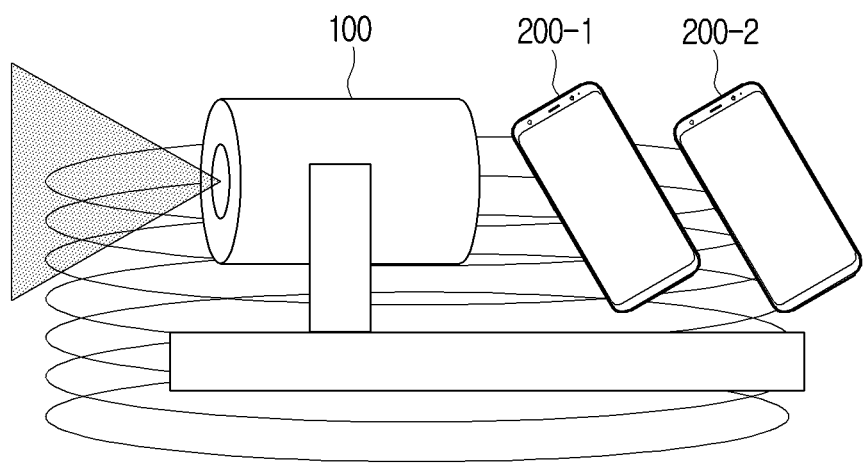
FIG. 3B is a diagram illustrating an example of connecting an electronic apparatus located at a surface with an external devices, from among a plurality of external devices according to an embodiment.

FIG. 3B is a diagram illustrating an example of connecting an electronic apparatus located at a surface with one from among a plurality of external devices according to an embodiment.

According to an embodiment, the electronic apparatus 100 may be implemented as a projector device projecting a projection image by being located at the surface of the table, the floor, or the like as in FIG. 3B. In this case, the electronic apparatus 100 may identify whether the external device is located within the pre-set radius of the electronic device 100. Specifically, the electronic apparatus 100 may identify whether the external device is located within the pre-set radius (e.g., first radius (e.g., radius of 1 m)) with the electronic apparatus 100 through the Bluetooth Low Energy method.

Further, based on the plurality of external devices 200-1 and 200-2 being identified as located within the pre-set radius of the electronic apparatus 100 through the Bluetooth Low Energy method as in FIG. 3B, the electronic apparatus 100 may identify the external device close in distance with the electronic apparatus 100 as the external device to perform connection with the electronic apparatus 100. In an example, the electronic apparatus 100 may obtain distance information between the plurality of external devices 200-1 and 200-2 and the electronic apparatus 100 through the signal strength of the plurality of external devices 200-1 and 200-2 received through the Bluetooth Low Energy method. Further, the electronic apparatus 100 may identify the external device 200-1 close in distance with the electronic apparatus 100 as the external device to perform connection with the electronic apparatus 100 from among the plurality of external devices 200-1 and 200-2.

Further, the electronic apparatus 100 may identify the standby time for beginning connection with the external device 200 based on the distance information with the external device 200-1. Further, based on the standby time elapsing, the electronic apparatus 100 may perform connection with the external device. In an example, the standby time may be increased or decreased according to the change in distance between the external device 200-1 and the electronic apparatus 100 which is obtained based on the distance information.

Figure 4:
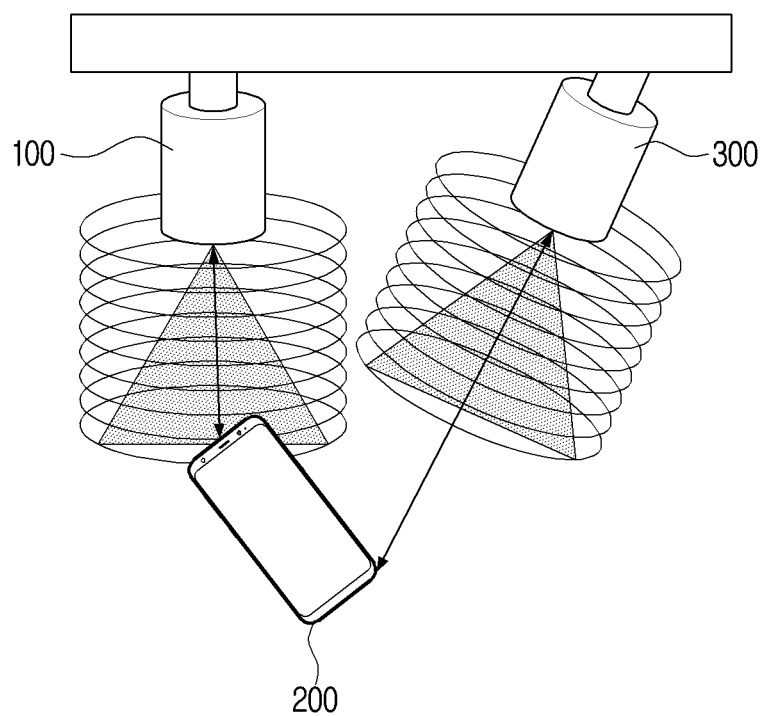
FIG. 4 is a diagram illustrating an example of identifying a projector device for performing connection with an external device according to an embodiment.

FIG. 4 is a diagram illustrating an example of identifying a projector device for performing connection with an external device according to an embodiment.

According to an embodiment, the electronic apparatus 100 may be implemented as a projector device projecting a projection image by being installed at a fixed structure, such as the ceiling, the wall, or the like as in FIG. 4. Further, a projector device 300 different from the electronic apparatus 100 may be installed within the pre-set radius (third radius (e.g., 2 m)) with the electronic apparatus 100 as in FIG. 4.

Further, the electronic apparatus 100 may identify whether the external device 200 is located within the pre-set radius of the electronic apparatus 100. Specifically, the electronic apparatus 100 may identify whether the external device 200 is located within the pre-set radius (e.g., first radius (e.g., radius of 1 m)) with the electronic apparatus 100 through the Bluetooth Low Energy method. In addition, the projector device 300 may identify whether the external device 200 is located within the pre-set radius of the projector device 300. Specifically, the projector device 300 may identify whether the external device 200 is located within the pre-set radius (e.g., first radius (e.g., radius of 1 m)) with the projector device 300 through the Bluetooth Low Energy method.

Based on the external device 200 being identified as located within the pre-set radius (e.g., first radius (e.g., radius of 1 m)) from each of the electronic apparatus 100 and the projector device 300, the electronic apparatus 100 may identify a device, from among the electronic apparatus 100 and the projector device 300, located relatively closely with the external device 200, as the device to perform connection with the external device 200. For example, the device, among the electronic apparatus 100 and the projector device 300, that is closer to the external device 200, as the device to perform connection with the external device 200. In an example, the electronic apparatus 100 may identify the device with the biggest signal strength received from the external device 200 through the Bluetooth Low Energy method from among the electronic apparatus 100 and the projector device 300 as the device to perform connection with the external device 200.

Further, based on the device to perform connection with the external device 200 being identified from among the electronic apparatus 100 and the projector device 300, a device which is identified as the device to perform connection with the external device 200 and the external device 200 may perform connection based on the standby time being elapsed.

Figure 5:
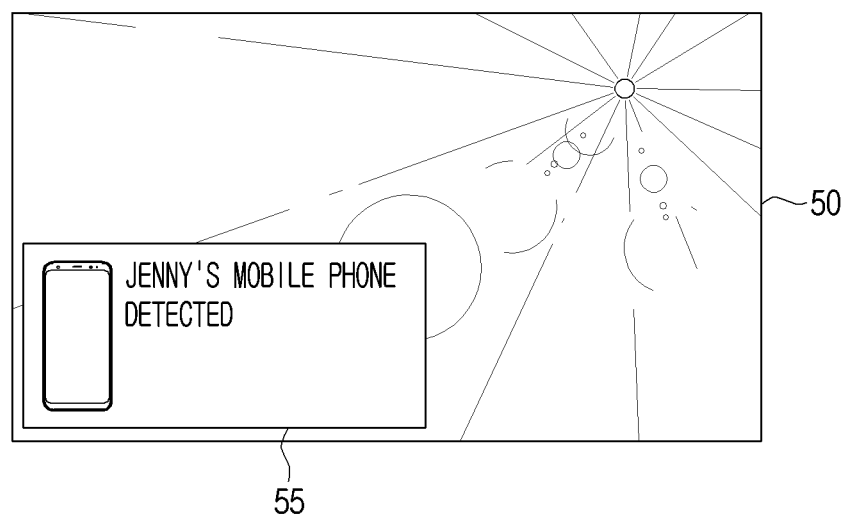
FIG. 5 is a diagram illustrating an example of providing first information corresponding to a standby time according to an embodiment.

FIG. 5 is a diagram illustrating an example of providing first information corresponding to a standby time according to an embodiment.

Figure 6A:
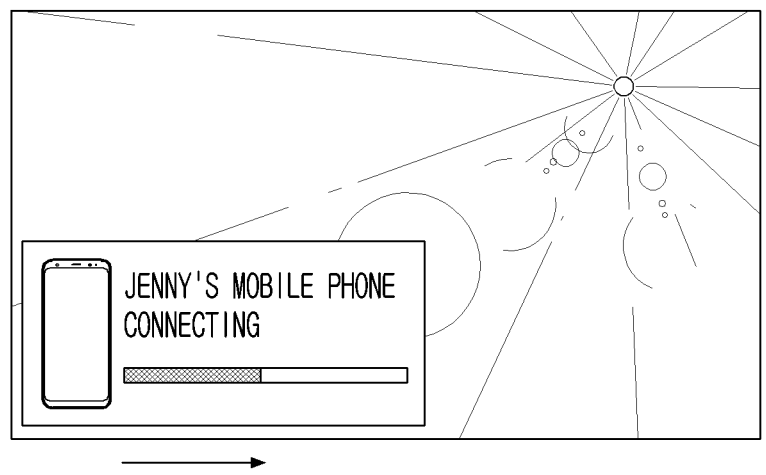
FIG. 6A is a diagram illustrating an example of providing second information notifying time being elapsed according to an embodiment.

FIG. 6A is a diagram illustrating an example of providing second information notifying time being elapsed according to an embodiment.

Figure 6B:
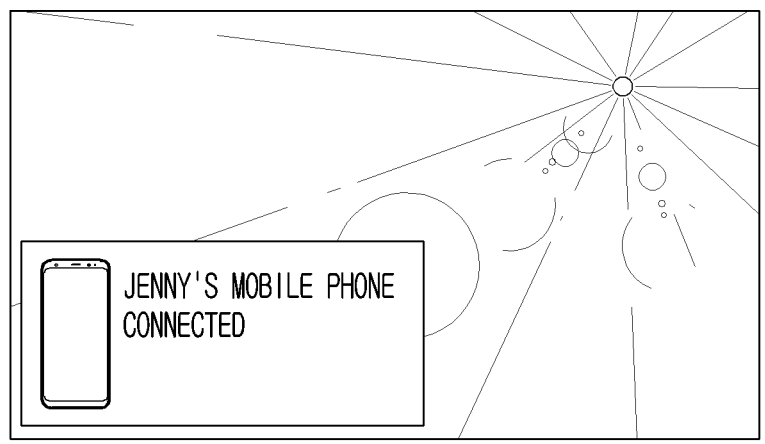
FIG. 6B is a diagram illustrating an example of providing information notifying connection with an external device according to an embodiment.

FIG. 6B is a diagram illustrating an example of providing information notifying connection with an external device according to an embodiment.

Based on the external device being located within the pre-set radius of the electronic apparatus 100, the electronic apparatus 100 may provide first information corresponding to the standby time. In an example, based on the electronic apparatus 100 being implemented as a projector device projecting a projection image, the electronic apparatus 100 may project an image so that first information 55 is displayed at one area of a projection image 50. Here, the first information 55 may include an icon corresponding to the external device which is located within the pre-set radius of the electronic apparatus 100 and information notifying that identification information (e.g., Jenny's mobile phone) and the corresponding external device have been detected (e.g., detected).

Further, after the first information 55 is provided, the electronic apparatus 100 may control the projector to project second information notifying that the standby time for performing connection with the external device 200 is being elapsed as in FIG. 6A.

The second information may include an icon corresponding to the external device located within the pre-set radius of the electronic apparatus 100, information of identification information (e.g., Jenny's mobile phone) and of connection being performed with the external device (e.g., connecting), and a gauge UI notifying that the standby time is elapsing as in FIG. 6A. In an example, in the gauge UI included in the second information, a gauge of a first color (e.g., blue) may be filled as the standby time is elapsed. According to an embodiment, the standby time being elapsed may correspond to the external device being placed within the pre-set radius of the electronic apparatus 100 for the entire duration of the standby time.

Further, based on the gauge of the gauge UI which is included in the second information being filled due to the standby time being elapsed, the electronic apparatus 100 may control the projector to project information notifying of being connected with the external device 200 as in FIG. 6B.

Figure 7A:
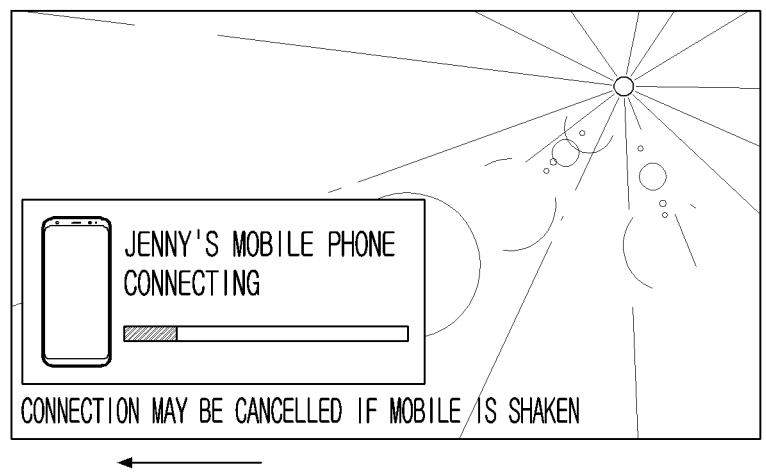
FIG. 7A is a diagram illustrating an example of providing second information notifying standby time being elapsed according to an embodiment.

FIG. 7A is a diagram illustrating an example of providing second information notifying standby time being elapsed according to an embodiment.

Figure 7B:
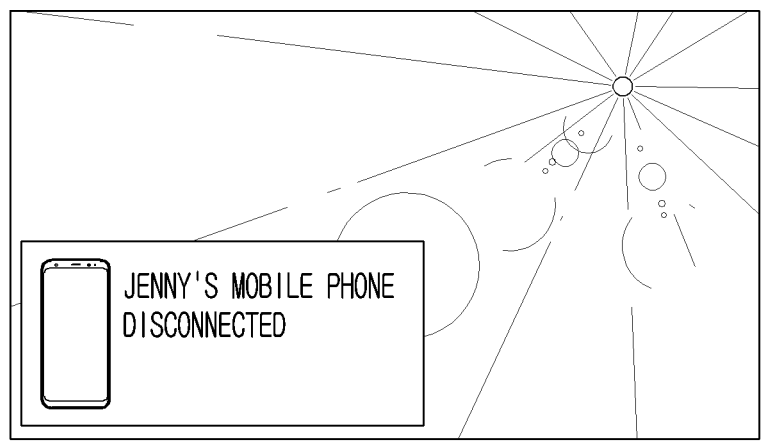
FIG. 7B is a diagram illustrating an example of providing information notifying connection with an external device according to an embodiment.

FIG. 7B is a diagram illustrating an example of providing information notifying connection with an external device according to an embodiment.

According to an embodiment, based on the external device being located within the pre-set radius of the electronic apparatus 100, the electronic apparatus 100 may provide first information 55 corresponding to the standby time as in FIG. 5. Further, after the first information 55 is provided, the electronic apparatus 100 may control the projector to project second information notifying that the standby time for performing connection with the external device 200 is being elapsed as in FIG. 6A.

According to an embodiment, based on the distance of the electronic apparatus and the external device 200 becoming farther apart through distance information between the electronic apparatus 100 and the external device 200 while the second information is being provided, the electronic apparatus 100 may control the projector to project fourth information notifying that the standby time for performing connection is increased as in FIG. 7A. Here, the fourth information may be decreased in gauge than the gauge in FIG. 6A because the standby time is increased as illustrated in FIG. 7A. Further, as an example, a gauge color included in the fourth information may be a second color (e.g., red) different from the color of the gauge of the second information. Further, as the distance of the electronic apparatus 100 and the external device 200 continue to become farther apart, the gauge included in the fourth information may continue to be decreased.

In addition, the fourth information may further include operation information for not performing connection with the external device (e.g., connection may not be performed if mobile is shaken).

In an embodiment, based on the distance of the electronic apparatus 100 and the external device 200 becoming farther apart by the pre-set radius (e.g., second radius) or more, the electronic apparatus 100 may control so as to not perform connection with the external device 200, and control the projector to project fifth information notifying that connection is not performed with the external device 200 as in FIG. 7B.

In an embodiment, based on an event corresponding to operation information for not performing connection with the external device being detected, the electronic apparatus 100 may control so as to not perform connection with the external device 200, and control the projector to project fifth information notifying that connection is not performed with the external device 200 as in FIG. 7B. In an example, based on an operation of shaking the external device 200 by a pre-set number of times (e.g., 2 times) being detected, the electronic apparatus 100 may control so as to not perform connection with the external device 200, and control the projector to project the fifth information.

Figure 8:
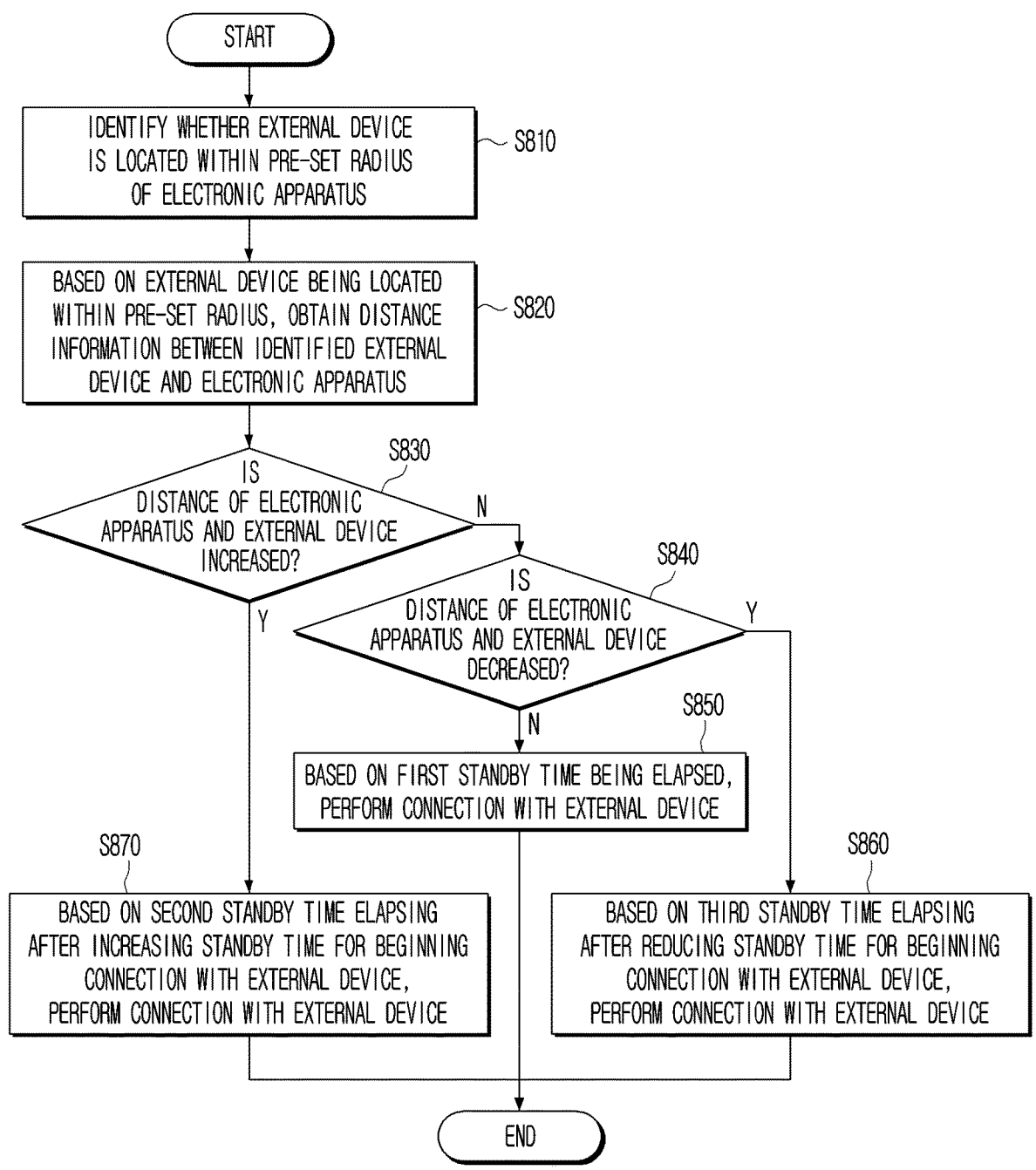
FIG. 8 is a flowchart illustrating a control method of an electronic apparatus according to an embodiment.

FIG. 8 is a flowchart illustrating a control method of an electronic apparatus according to an embodiment.

Referring to FIG. 8, the electronic apparatus 100 may identify whether the external device is located within the pre-set radius of the electronic apparatus 100 (S810). In an example, the electronic apparatus 100 may identify whether the external device is located within the pre-set radius of the electronic apparatus 100 through the Bluetooth Low Energy method. In an example, the electronic apparatus 100 may identify whether the external device is located within the pre-set radius of the electronic apparatus 100 through the ToF sensor.

Further, the electronic apparatus 100 may obtain, based on the external device being located within the pre-set radius, distance information between the identified external device and the electronic apparatus 100 (S820). In an example, the electronic apparatus 100 may obtain, based on the signal strength received from the external device with the Bluetooth Low Energy method, distance information between the electronic apparatus 100 and the external device. In an example, the electronic apparatus 100 may obtain distance information between the electronic apparatus 100 and the external device through the ToF sensor. In an example, the electronic apparatus 100 may obtain distance information between the electronic apparatus 100 and the external device through an image sensor. In an example, the electronic apparatus 100 may obtain distance information between the electronic apparatus 100 and the external device through a LiDAR sensor.

Further, the electronic apparatus 100 may identify whether the distance of the electronic apparatus 100 and the external device is increased (S830).

Based on the distance of the electronic apparatus 100 and the external device being identified as not having increased (S830-N), the electronic apparatus 100 may identify whether the distance of the electronic apparatus 100 and the external device is decreased (S840). In FIG. 8, although step S840 is described as being performed after step S830, embodiments are not limited thereto, and step S840 may be performed before step S830, or step S840 and step S830 may be performed together.

Based on the distance of the electronic apparatus 100 and the external device being identified as not having decreased (S840-N), the electronic apparatus 100 may perform connection with the external device based on a first standby time being elapsed (S850). That is, based on the distance of the electronic apparatus 100 and the external device being identified as not having decreased, the electronic apparatus 100 may perform connection with the external device based on the first standby time corresponding to the pre-set time (e.g., 5 seconds) being elapsed because the distance of the electronic apparatus 100 and the external device is not changed.

Based on the distance of the electronic apparatus 100 and the external device being identified as having decreased (S840-Y), the electronic apparatus 100 may perform connection with the external device based on a third standby time elapsing after reducing the standby time for beginning connection with the external device (S860).

That is, based on the distance of the electronic apparatus 100 and the external device being identified as having decreased, it may be determined as there being an intent to perform connection with the external device. Then, the electronic apparatus 100 may decrease the first standby time corresponding to the pre-set time (e.g., 5 seconds), and perform connection with the external device based on the third standby time (e.g., 3 seconds) elapsing from a time-point at which the external device is identified.

Further, based on the distance of the electronic apparatus 100 and the external device being identified as having increased (S830-Y), the electronic apparatus 100 may perform connection with the external device based on the second standby time elapsing after increasing the standby time for beginning connection with the external device (S870).

That is, based on the distance of the electronic apparatus 100 and the external device being identified as having increased, it may be determined as there being no intent to perform connection with the external device. Further, the electronic apparatus 100 may increase the first standby time corresponding to the pre-set time (e.g., 5 seconds), and perform connection with the external device based on the second standby time (e.g., 10 seconds) elapsing from the timepoint at which the external device is identified. Here, based on the electronic apparatus 100 and the external device continuing to become farther apart, the second standby time may continue to be increased.

Further, based on the electronic apparatus 100 and the external device becoming farther apart by the pre-set radius (e.g., second radius) or more prior to the second standby time being elapsed or an event corresponding to operation information for not performing connection with the external device being detected, the electronic apparatus 100 may control so as to not perform connection with the external device.

Figure 9:
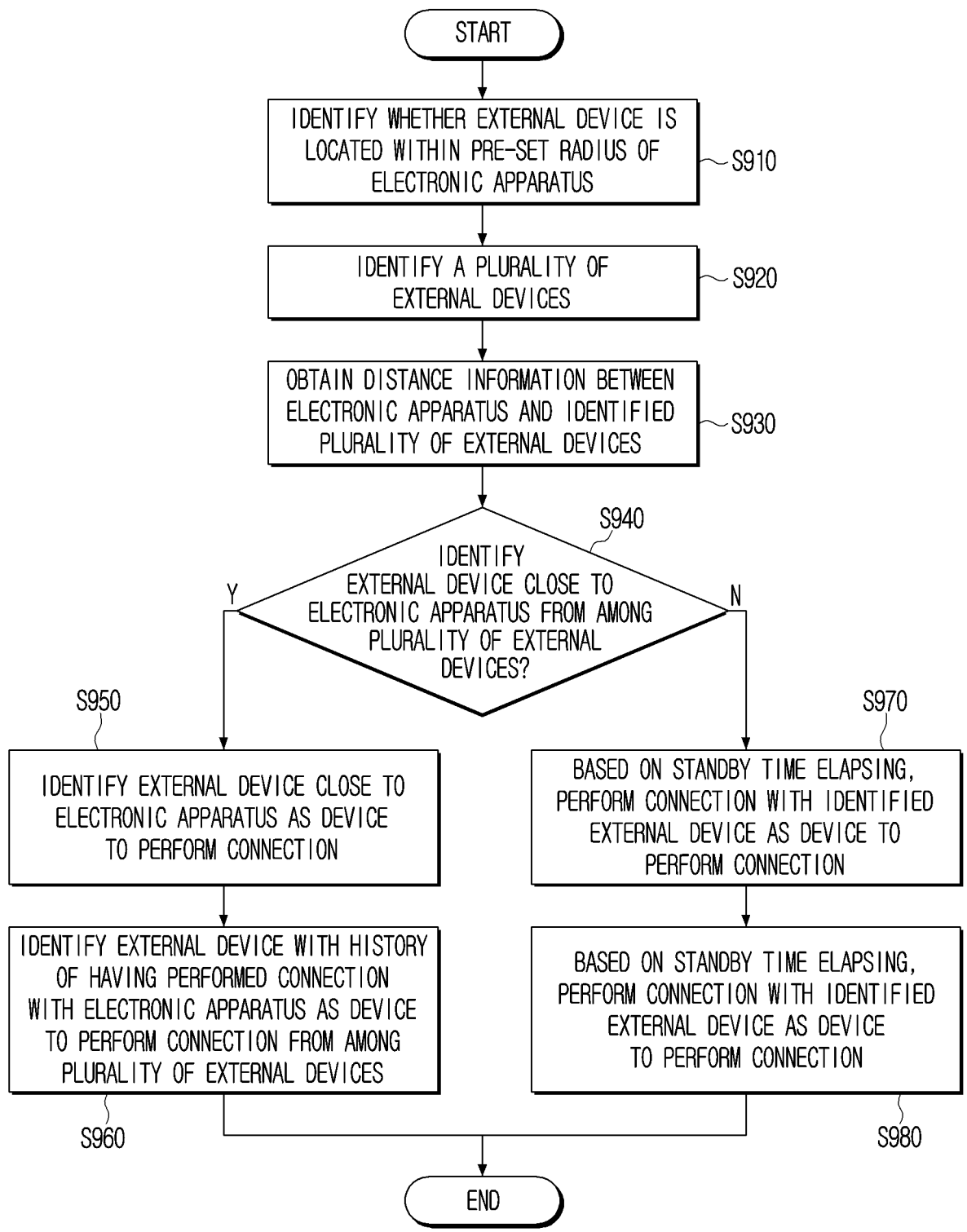
FIG. 9 is a flowchart illustrating a control method of an electronic apparatus according to an embodiment.

FIG. 9 is a flowchart illustrating a control method of an electronic apparatus according to an embodiment.

Referring to FIG. 9, the electronic apparatus 100 may identify whether an external device is located within the pre-set radius of the electronic apparatus 100 (S910). Further, the electronic apparatus 100 may identify that a plurality of external devices is located within the pre-set radius of the electronic apparatus 100 (S920). In an example, the electronic apparatus 100 may identify, based on a plurality of mobile devices being located within the pre-set radius of the electronic apparatus 100, the identified external device as in plurality.

Further, the electronic apparatus 100 may obtain distance information between the electronic apparatus 100 and the identified plurality of external devices (S930). In an example, the electronic apparatus 100 may obtain distance information between the electronic apparatus 100 and the plurality of external devices based on the signal strength received from the plurality of external devices with the Bluetooth Low Energy method. That is, the signal strength received through the Bluetooth Low Energy method from the external device which is located closely with the electronic apparatus 100 may be greater than the signal strength received through the Bluetooth Low Energy method from the external device which is located far from the electronic apparatus 100.

Further, the electronic apparatus 100 may determine whether the external device close to the electronic apparatus 100 is identifiable from among the plurality of external devices (S940). In an example, the electronic apparatus 100 may determine, based on a difference in distance between the electronic apparatus 100 and the plurality of external devices being less than a pre-set distance (e.g., 10 cm) based on the obtained distance information, the external device close to the electronic apparatus 100 as not identifiable from among the plurality of external devices. Further, the electronic apparatus 100 may determine, based on the difference in distance between the electronic apparatus 100 and the plurality of external devices being the pre-set distance (e.g., 10 cm) or more based on the obtained distance information, the external device close to the electronic apparatus 100 as identifiable from among the plurality of external devices.

Based on the external device close to the electronic apparatus 100 being determined as identifiable from among the plurality of external devices (S940-Y), the electronic apparatus 100 may identify the external device close to the electronic apparatus 100 as the device to perform connection with the electronic apparatus 100 (S950). Further, the electronic apparatus 100 may perform connection with the external device which is identified as the device to perform connection with the electronic apparatus 100 based on the standby time elapsing (S960). That is, the electronic apparatus 100 may perform connection with the external device identified as the device to perform connection with the electronic apparatus 100 based on the standby time corresponding to the pre-set time (e.g., 5 seconds) being elapsed from the time point at which the external device is identified.

Based on determining that the external device close to the electronic apparatus 100 is not identifiable from among the plurality of external devices (S940-N), the electronic apparatus 100 may identify the external device with a history of having performed connection with the electronic apparatus 100 as the device to perform connection from among the plurality of external devices (S970). Further, the electronic apparatus 100 may perform connection with the external device identified as the device to perform connection based on the standby time elapsing (S980). That is, the electronic apparatus 100 may perform connection with the external device identified as the device to perform connection with the electronic apparatus 100 based on the standby time corresponding to the pre-set time (e.g., 5 seconds) being elapsed from the time point at which the external device is identified.

Figure 10:
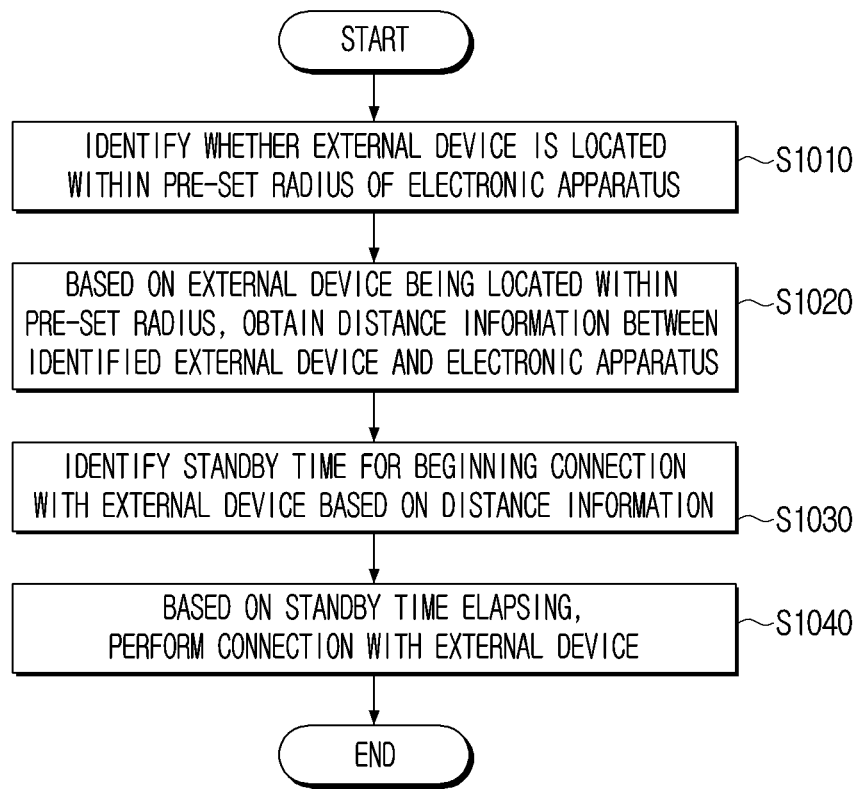
FIG. 10 is a flowchart illustrating a control method of an electronic apparatus according to an embodiment.

FIG. 10 is a flowchart illustrating a control method of an electronic apparatus according to an embodiment.

Referring to FIG. 10, the electronic apparatus 100 may identify whether the external device is located within the pre-set radius of the electronic apparatus 100 (S1010). In an example, the electronic apparatus 100 may identify the external device located within the pre-set radius of the electronic apparatus 100 through the Bluetooth Low Energy (BLE) method.

Further, the electronic apparatus 100 may obtain distance information between the identified external device and the electronic apparatus 100 based on the external device being located within the pre-set radius. In an example, the electronic apparatus 100 may obtain distance information between the identified external device and the electronic apparatus 100 by using at least one from among the BLE method and the ToF sensor.

Further, the electronic apparatus 100 may identify the standby time for beginning connection with the external device based on the distance information (S1030).

In an example, based on the distance between the electronic apparatus 100 and the external device being the first distance through distance information, the standby time may be the first time, and based on the distance between the electronic apparatus 100 and the external device being the second distance which is farther than the first distance through distance information, the standby time may be the second time which is longer than the first time.

In an example, based on the distance between the electronic apparatus 100 and the external device being the first distance through distance information, the standby time may be the first time, and based on the distance between the electronic apparatus 100 and the external device becoming farther than the first distance through distance information, the electronic apparatus 100 may increase the first time. Then, based on the distance between the electronic apparatus 100 and the external device becoming closer than the first distance through distance information, the electronic apparatus 100 may decrease the first time.

Then, based on the standby time elapsing, the electronic apparatus 100 may perform connection with the external device (S1040). On the other hand, based on the distance between the electronic apparatus 100 and the external device becoming farther apart by the pre-set radius or more through distance information, the electronic apparatus 100 may control so as to not perform connection with the external device.

Further, the electronic apparatus 100 may further include the projector projecting an image, and based on the external device being located within the pre-set radius, the electronic apparatus 100 may control the projector to project information corresponding to the standby time. Further, based on the distance between the external device and the electronic apparatus 100 becoming farther apart based on distance information, the projector may be controlled to project information notifying that the standby time for performing connection with the external device is increased. Then, based on the distance between the external device and the electronic apparatus 100 becoming close based on distance information, the projector may be controlled to project information notifying that the standby time for performing connection with the external device is decreased.

Figure 11:
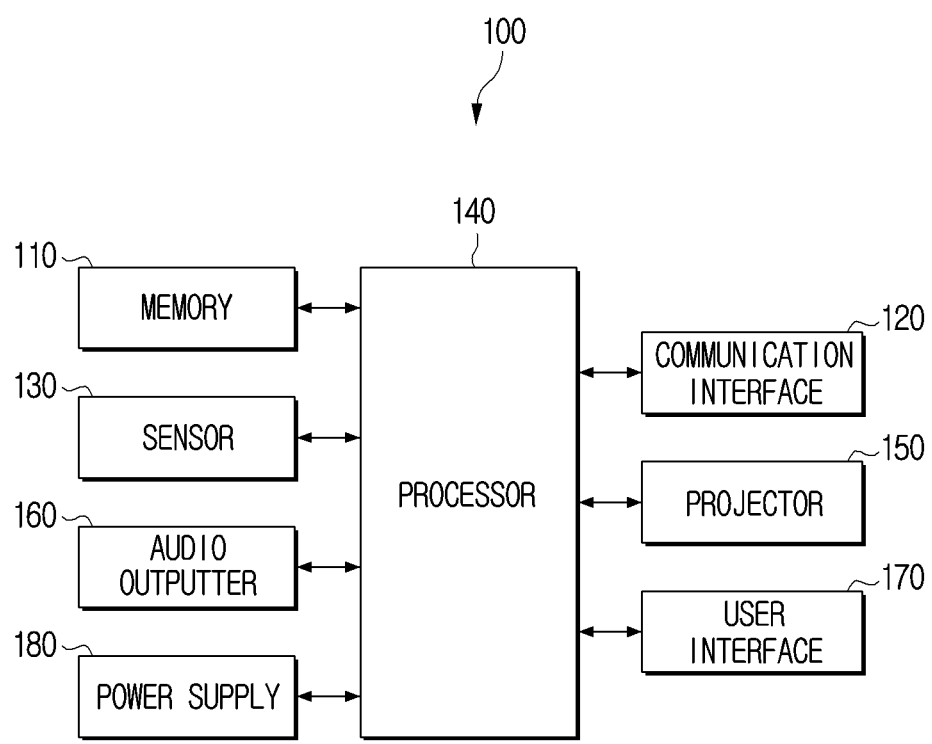
FIG. 11 is a block diagram illustrating a detailed configuration of an electronic apparatus according to an embodiment.

FIG. 11 is a block diagram illustrating a detailed configuration of an electronic apparatus according to an embodiment. FIG. 11 is an embodiment of the electronic apparatus 100 being implemented as the projector device which includes the projector 150 configured to project a projection image.

Referring to FIG. 11, the electronic apparatus 100 may include a memory 110, a communication interface 120, a sensor 130, a processor 140, a projector 150, an audio outputter 160, user interface 170, and a power supply 180. The configuration illustrated in FIG. 11 is merely one embodiment, and some configurations may be omitted, and new configurations may be added. Further, because descriptions of the memory 110, the communication interface 120, the sensor 130, and the processor 140 have been described in FIG. 1, the detailed descriptions will be omitted.

The projector may be a configuration configured to project an image to the outside. According to an embodiment, the projector 150 may be implemented to various projection methods (e.g., cathode-ray tube (CRT) method, liquid crystal display (LCD) method, digital light processing (DLP) method, laser method, etc.). In an example, the CRT method is fundamentally the same in principle with a CRT monitor. The CRT method may involve displaying an image in a screen by enlarging the image with a lens at a front of the cathode-ray tube (CRT). Based on a number of cathode-ray tubes, it may be divided into a one-tube type and a three-tube type, and in the case of the three-tube type, the cathode-ray tube of red, green and blue may be separately divided and implemented.

In another example, the LCD method may be a method of displaying an image by transmitting light from a light source to a liquid crystal. The LCD method may be divided into a one panel type and a three panel type, and in the case of the three panel type, light emitted from the light source may be separated into red, green, and blue in a dichroic mirror (a mirror which reflects only light of a specific color and transmits the rest) and after being transmitted through the liquid crystal, light may be gathered again to one place.

In another example, the DLP method may be a method of displaying an image by using a digital micromirror device (DMD) chip. The projector of the DLP method may include a light source, a color wheel, a DMD chip, a projection lens, and the like. The light output from the light source may produce a color as it passes the rotating color wheel. The light which passed the color wheel may be input to the DMD chip. The DMD chip may include numerous micro-mirrors, and reflect light input to the DMD chip. The projection lens may perform the role of enlarging the light reflected from the DMD chip to an image scale.

In another example, the laser method may include a diode pumped solid state (DPSS) laser and a galvanometer. The laser which outputs various colors may use a laser which superposed an optical-axis by using a special mirror after installing three DPSS lasers for each of the RGB colors. The galvanometer may move the mirror at a fast rate by including a mirror and a motor of a high output. For example, the galvanometer may rotate the mirror at a maximum of 40 KHz/sec. The galvanometer may be mounted along a scan direction, and because the projector typically scans a flat surface, the galvanometer may also be divided toward an x-axis and a y-axis and provided.

The projector 150 may include light sources of various types. For example, the projector 150 may include at least one light source from among a lamp, an LED, or a laser.

The projector 150 may be configured to output an image in a 4:3 screen ratio, a 5:4 screen ratio, and a 16:9 wide screen ratio according to a use of the electronic apparatus 100, a user setting, or the like, and output an image to various resolutions such as 854*480 (WVGA), 800*600 (SVGA), 1024*768 (XGA), 1280*720 (WXGA), 1280*800 (WXGA), 1280*1024 (SXGA), 1600*1200 (UXGA), and 1920*1080 (Full HD).

The projector 150 may be configured to perform various functions for adjusting an output image by the control of the processor 140. For example, the projector 150 may perform the functions such as, zoom, keystone, Quick Corner (4 Corner) keystone, and lens shift.

Specifically, the projector 150 may enlarge or reduce the image according to the distance with the screen (projection distance). That is, the zoom function may be performed according to the distance with the screen. At this time, the zoom function may include a hardware method of adjusting the scale of the screen image by moving the lens and a software method of adjusting the scale of the screen image through cropping or the like of the image. Based on the zoom function being performed, an adjustment of an image focal point may be necessary. For example, a method of adjusting the focal point may include a manual focus method, a motorized method, and the like. The manual focus method may mean a method of manually adjusting the focal point, and the motorized method may mean a method of automatically adjusting the focal point by the projector using an embedded motor when the zoom function is performed. When the zoom function is performed, the projector 150 may provide a digital zoom function through a software, and provide an optical zoom function of performing the zoom function by moving the lens through a driving part.

In addition, the projector 150 may perform the keystone function. If the height is not correct in a front surface projection, the screen image may be distorted towards the top or the bottom. The keystone function may mean a function of correcting the distorted screen image. For example, based on distortion occurring in the left and right directions of the screen image, correction may be carried out using a horizontal keystone, and based on distortion occurring in the top and bottom directions, correction may be carried out by using a vertical keystone. The Quick Corner (4 Corner) function may be a function of correcting the screen image when a center area of the screen image is normal but balance at a corner area is not level. The lens shift function may be function which moves the screen image as is when the screen image is deviated from the screen.

The projector 150 may provide the zoom/keystone/focus function by automatically analyzing the surrounding environment and projection environment without a user input. Specifically, the projector 150 may be configured to automatically provide the zoom/keystone/focus function based on the distance between the electronic apparatus 100 and the screen which is detected through a sensor (depth camera, distance sensor, infrared sensor, illumination sensor, etc.), information on a space at which the electronic apparatus 100 is currently located, information on quantity of ambient light, and the like.

In addition, the projector 150 may be configured to provide a lighting function by using the light source. Specifically, the projector 150 may be configured to provide the lighting function by outputting the light source using a light emitting diode (LED). The projector 150 according to an embodiment may include one LED, and the electronic apparatus according to another embodiment may include a plurality of LEDs. The projector 150 may output the light source using a surface light emitting LED according to an embodiment. Here, the surface light emitting LED may mean an LED having a structure in which an optical sheet is provided at a top side of the LED so that the light source is uniformly distributed and output. Specifically, if the light source is output through the LED, the light source may be uniformly distributed through the optical sheet, and the light source which is distributed through the optical sheet may be incident to the display panel.

The projector 150 may be configured to provide the user with a dimming function for adjusting an intensity of the light source. Specifically, based on the user input for adjusting the light source intensity being received from the user through the user interface 170 (e.g., a touch display button or a dial), the projector 150 may be configured to control the LED to output the light source intensity which corresponds to the received user input.

In addition, the projector 150 may be configured to provide the dimming function based on the content analyzed by the processor 140 without the user input. Specifically, the projector 150 may be configured to control the LED to output the light source intensity based on information on the content (e.g., content type, content brightness, etc.) currently being provided.

The projector 150 may be configured to control a color temperature by the control of the processor 140. Here, the processor 140 may be configured to control the color temperature based on the content. Specifically, based on the content being identified to be output, the processor 140 may be configured to obtain color information for each frame of the content which is determined for output. Further, the processor 140 may be configured to control the color temperature based on the obtained color information for each frame. Here, the processor 140 may be configured to obtain at least one main color of a frame based on the color information for each frame. Further, the processor 140 may be configured to adjust the color temperature based on the obtained at least one main color. For example, the processor 140 may divide the adjustable color temperature to a warm type or a cold type. Here, it may be assumed that the frame to be output (hereinbelow, output frame) includes a scene in which fire has occurred. The processor 140 may be configured to identify (or obtain) that the main color is red based on the color information included in the currently output frame. Then, the processor 140 may be configured to identify the color temperature corresponding to the identified main color (red). Here, the color temperature corresponding to red may be the warm type. The processor 140 may be configured to use an artificial intelligence model to obtain color information of the frame or the main color. According to an embodiment, the artificial intelligence model may be stored in the electronic apparatus 100 (e.g., memory 110). According to another embodiment, the artificial intelligence model may be stored in an external server capable of communicating with the electronic apparatus 100.

The electronic apparatus 100 may control the lighting function by operating with the external device. Specifically, the electronic apparatus 100 may receive lighting information from the external device. Here, lighting information may include at least one from among brightness information or color temperature information which is set from the external device. Here, the external device may mean a device connected to the same network as with the electronic device 100 (e.g., an IoT device included in the same home/work network), or a device capable of communicating with the electronic apparatus but not in the same network as with the electronic apparatus 100 (e.g., a remote control server). For example, it may be assumed that an external lighting device (IoT device) included in the same network as with the electronic apparatus 100 is outputting a red lighting at a brightness of 50. The external lighting device (IoT device) may be configured to directly or indirectly transmit lighting information (e.g., information showing that red lighting is being output at a brightness of 50) to the electronic apparatus 100. Here, the electronic apparatus 100 may control the output of the light source based on the lighting information received from the external lighting device. For example, if the lighting information received from the external lighting device includes information of the red lighting being output at a brightness of 50, the electronic apparatus 100 may output red lighting at the brightness of 50.

The electronic apparatus 100 may control the lighting function based on biometric information. Specifically, the processor 140 may obtain the biometric information of the user. Here, the biometric information may include at least one from among a temperature, a number of heart rates, blood pressure, breath, and electrocardiogram of the user. The biometric information may include various information other than the information described above. In an example, the electronic apparatus may include a sensor for measuring biometric information. The processor 140 may be configured to obtain the biometric information of the user through the sensor, and control the output of the light source based on the obtained biometric information. In another example, the processor 140 may be configured to receive biometric information from the external device through the communication interface 120. Here, the external device may mean a mobile communication device (e.g., a smartphone or a wearable device) of the user. The processor 140 may be configured to obtain the biometric information of the user from the external device, and control the output of the light source based on the obtained biometric information. According to an embodiment, the electronic apparatus may identify whether the user is asleep, and based on the user being identified as sleeping (or preparing to sleep), the processor 140 may be configured to control the output of the light source based on the biometric information of the user.

The audio outputter 160 may be a configuration for outputting an audio signal. Specifically, the audio outputter 160 may include an audio output mixer, an audio signal processor, and a sound output module. The audio output mixer may synthesize a plurality of audio signals to be output to at least one audio signal. For example, the audio output mixer may be configured to synthesize an analog audio signal and another analog audio signal (e.g., analog audio signal received from the outside) to at least one analog audio signal. The sound output module may include a speaker or an output terminal. The sound output module according to an embodiment may include a plurality of speakers, and in this case, the sound output module may be provided inside of a main body, and sound radiated by covering at least a part of a diaphragm of the sound output module may be transferred to the outside of the main body by passing a waveguide. The sound output module may include a plurality of sound output units, and because the plurality of sound output units is symmetrically provided to an exterior of the main body, sound may be radiated to all directions, that is, 360-degree omni-direction.

The user interface 170 may include an input device of various types. For example, the user interface 170 may include a physical button. At this time, the physical button may include a function key, a direction key (e.g., four direction key), or a dial button. According to an embodiment, the physical button may be implemented as a plurality of keys. According to another embodiment, the physical button may be implemented as one key. Here, based on the physical button being implemented as one key, the electronic apparatus 100 may receive the user input of one key being pressed for a threshold time or more. Based on the user input of the one key being pressed for the threshold time or more being received, the processor 140 may be configured to perform a function corresponding to the user input. For example, the processor 140 may be configured to provide the lighting function based on the user input.

In addition, the user interface 170 may be configured to receive the user input by using a non-contact method. Based on receiving the user input through a contact method, physical force is to be transferred to the electronic apparatus. Accordingly, a method for controlling the electronic apparatus may be necessary regardless of physical force. Specifically, the user interface 170 may be configured to receive a user gesture, and perform an operation corresponding to the received user gesture. Here, the user interface 170 may be configured to receive the user gesture through the sensor (e.g., image sensor or infrared sensor).

In addition, the user interface 170 may be configured to receive the user input by using a touch method. For example, the user interface 170 may be configured to receive the user input through a touch sensor. According to an embodiment, the touch method may be implemented as a non-contact method. For example, the touch sensor may be configured to determine whether the body of the user has approached within a threshold distance. Here, the touch sensor may be configured to identify the user input even when the user is not in contact with the touch sensor. According to another embodiment, the touch sensor may be configured to identify the user input of the user being in contact with the touch sensor.

The electronic apparatus 100 may be configured to receive the user input through various methods other than the user interface described above. In an embodiment, the electronic apparatus 100 may receive the user input through an external remote control device. Here, the external remote control device may be a remote control device corresponding to the electronic apparatus 100 (e.g., an electronic apparatus dedicated control device) or a mobile communication device of the user (e.g., a smartphone or a wearable device). Here, the mobile communication device of the user may be stored with an application for controlling the electronic apparatus. The mobile communication device may be configured to obtain the user input through the stored application, and transmit the obtained user input to the electronic apparatus 100. The electronic apparatus 100 may be configured to perform an operation corresponding to a control command of the user by receiving the user input from the mobile communication device.

The electronic apparatus 100 may receive the user input by using voice recognition. According to an embodiment, the electronic apparatus 100 may receive the user voice through a microphone included in the electronic apparatus. According to another embodiment, the electronic apparatus 100 may receive the user voice from the microphone or the external device. Specifically, the external device may be configured to obtain the user voice through the microphone of the external device, and transmit the obtained user voice to the electronic apparatus 100. The user voice transmitted from the external device may be audio data or digital data in which audio data is converted (e.g., audio data converted to a frequency domain, etc.). Here, the electronic apparatus 100 may perform an operation corresponding to the received user voice. Specifically, the electronic apparatus 100 may receive audio data corresponding to the user voice through the microphone. Further, the electronic apparatus 100 may convert the received audio data to digital data. Then, the electronic apparatus 100 may convert the converted digital data to text data by using a Speech to Text (STT) function. According to an embodiment, the STT function may be performed directly in the electronic apparatus 100, and according to another embodiment, the STT function may be performed in the external server. The electronic apparatus 100 may transmit digital data to the external server. The external server may be configured to convert digital data to text data, and obtain control command data based on the converted text data. The external server may be configured to transmit control command data (at this time, text data may also be included) to the electronic apparatus 100. The electronic apparatus 10 may perform an operation corresponding to the user voice based on the obtained control command data.

The electronic apparatus 100 may provide a voice recognition function by using one assistance (or artificial intelligence personal assistant, e.g., Bixby™, etc.), but this is merely one embodiment, and may provide the voice recognition function through a plurality of assistances. At this time, the electronic apparatus 100 may provide the voice recognition function by selecting one from among the plurality of assistances based on a trigger word corresponding to the assistance or a specific key present on a remote controller.

The electronic apparatus 100 may receive the user input by using a screen interaction. The screen interaction may mean a function of an electronic apparatus identifying whether a pre-determined event is to occur through an image projected to the screen (or a projection surface), and obtaining the user input based on the pre-determined event. Here, the predetermined event may mean an event in which a pre-determined object is identified at a specific location (e.g., location at which the UI for receiving the user input is projected). Here, the pre-determined object may include at least one from among a body part of the user (e.g., finger), a pointer, or a laser point. The electronic apparatus 100 may identify, based on a pre-determined object being identified at a location corresponding to the projected UI, the user input selecting the projected UI as having been received. For example, the electronic apparatus 100 may project a guide image to display the UI on the screen. Then, the electronic apparatus 100 may identify whether the user selects the projected UI. Specifically, the electronic apparatus 100 may identify, based on the pre-determined event being identified at a location of the projected UI, as the user having selected the projected UI. Here, the projected UI may include at least one item. Here, the electronic apparatus 100 may perform spatial analysis to identify whether the pre-determined event is at the location of the projected UI. Here, the electronic apparatus 100 may perform spatial analysis through the sensor (e.g., image sensor, infrared sensor, depth camera, distance sensor, etc.). The electronic apparatus 100 may identify whether the pre-determined event is to occur at the specific location (location at which the UI is projected) by performing spatial analysis. Further, based on identifying that the pre-determined event is to occur at the specific location (location at which the UI is projected), the electronic apparatus 100 may identify the user input for selecting the UI corresponding to the specific location as being received.

Figure 12:
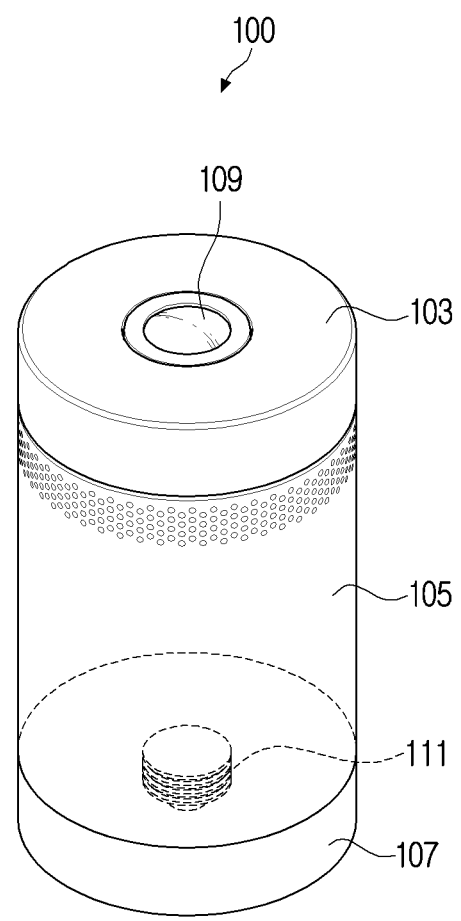
FIG. 12 is a perspective diagram illustrating an exterior of an electronic apparatus 100 according to an embodiment.

The power supply 180 may provide power to various configuration of the electronic apparatus 100 by receiving power from the outside. The power supply 180 according to an embodiment may receive power through various methods. In an embodiment, the power supply 180 may receive power by using a connector 111 as illustrated in FIG. 12. In addition, the power supply 180 may receive power by using a DC power cord of 220V. However, embodiments are not limited thereto, and the electronic apparatus may receive power by using a USB power cord or receive power by using a wireless charging method.

In addition, the power supply 180 may receive power by using an internal battery or an external battery. The power supply 180 according to an embodiment may receive power through the internal battery. In an example, the power supply 180 may be configured to charge power of the internal battery by using at least one from among a 220V DC power cord, a USB power cord, and a USB C-Type power cord, and receive power through the charged internal battery. In addition, the power supply 180 according to an embodiment may receive power through the external battery. In an example, when connection of the electronic apparatus and the external battery is performed through various wired communication methods such as a USB power cord, a USB C-Type power cord, and a socket home, the power supply 180 may receive power through the external battery. That is, the power supply 180 may receive power directly from the external battery, or charge the internal battery through the external battery and receive power from the charged internal battery.

The power supply 180 according to an embodiment may receive power by using at least one from among a plurality of power supply methods described above.

With respect to power consumption, the electronic apparatus 100 may have a power consumption of less than or equal to a pre-set value (e.g., 43 W) according to a socket form and other standards. At this time, the electronic apparatus 100 may change the power consumption to reduce power consumption when using the battery. That is, the electronic apparatus 100 may change the power consumption based on a power supply method, power usage, and the like.

The electronic apparatus 100 according to an embodiment may provide various smart functions.

Specifically, the electronic apparatus 100 may be connected with the mobile terminal device for controlling the electronic apparatus 100 and a screen image output from the electronic apparatus may be controlled through the user input which is input from the mobile terminal device. In an example, the mobile terminal device may be implemented as a smartphone which includes a touch display, the electronic apparatus 100 may receive screen image data which is provided from the mobile terminal device from the mobile terminal device and output the received screen image data, and the screen image output from the electronic apparatus 100 may be controlled according to the user input which is input from the mobile terminal device.

The electronic apparatus 100 may perform connection with the mobile terminal device through various communication methods such as Miracast, Airplay, and wireless DEX Remote PC method and share content or music provided from the mobile terminal device.

Further, the mobile terminal device and the electronic apparatus 100 may be configured such that connection is performed using various connection methods. In an embodiment, wireless connection may be performed by searching for the electronic apparatus 100 from the mobile terminal device, or wireless connection may be performed by searching for the mobile terminal device from the electronic apparatus 100. Then, the electronic apparatus 100 may output content provided from the mobile terminal device.

In an embodiment, based on a pre-set gesture being detected (e.g., motion tap view) through the display of the mobile terminal device after the mobile terminal device is located near the electronic apparatus while specific content or music is being output from the mobile terminal device, the electronic apparatus 100 may output content or music being output from the mobile terminal device.

In an embodiment, based on the mobile terminal device becoming closer with the electronic apparatus 100 by less than or equal to a pre-set distance (e.g., non-contact tap view) or the mobile terminal device being contacted twice at short intervals with the electronic apparatus 100 (e.g., contact tap view) while specific content or music is being output from the mobile terminal device, the electronic apparatus 100 may output content or music being output from the mobile terminal device.

In the above-described embodiment, a screen image which is the same as the screen image being provided from the mobile terminal device has been described as being provided from the electronic apparatus 100, but embodiments are not limited thereto. That is, based on connection between the mobile terminal device and the electronic apparatus 100 being established, a first screen image provided from the mobile terminal device may be output from the mobile terminal device, and a second screen image provided from the mobile terminal device which is different from the first screen image may be output from the electronic apparatus 100. In an example, the first screen image may be a screen image provided by a first application installed in the mobile terminal device, and the second screen image may be a screen image provided by a second application installed in the mobile terminal device. In an example, the first screen image and the second screen image may be screen images different from each other which are provided from one application that is installed in the mobile terminal device. In addition, in an example, the first screen image may be a screen image including a remote control type UI for controlling the second screen image.

The electronic apparatus 100 according to an embodiment may output a standby screen image. In an example, based on the electronic apparatus 100 not performing connection with the external device or no input being received during a pre-set time from the external device, the electronic apparatus 100 may output the standby screen image. The condition for the electronic apparatus 100 to output the standby screen image is not limited to the above-described examples, and the standby screen image may be output according to various conditions.

Further, in FIG. 11, the electronic apparatus 100 has been described as a projector device projecting a projection image, but the electronic apparatus 100 according to embodiments is not limited thereto. In an example, the electronic apparatus 100 may further include a display. The display may display various images. Here, the image may be a concept including at least one from among a still image or a motion image, and the display may display various images such as broadcast content and multimedia content. In addition, the display may also display various user interfaces (UIs) and icons.

Further, as described above, the display may be implemented to a display of various forms such as liquid crystal display (LCD), light emitting diode (LED), organic light emitting diodes (OLED), Liquid Crystal on Silicon (LCoS), and digital light processing (DLP). In addition, the display may also be included with a driving circuit capable of being implemented in forms such as a-si TFT, low temperature poly silicon (LTPS) TFT, and organic TFT (OTFT), a backlight unit, and the like. In addition, the display may be coupled with a touch detecting part and may be implemented as a touch screen.

FIG. 12 is a perspective diagram illustrating an exterior of the electronic apparatus 100 according to an embodiment.

Referring to FIG. 12, the electronic apparatus 100 may include a head 103, a main body 105, a projection lens 109, a connector 111, or a cover 107.

The electronic apparatus 100 may be a device of various forms. Specifically, the electronic apparatus 100 may be the projector device configured to enlarge and project an image to the wall or the screen, and the projector device may be a digital light processing (DLP) method projector which uses an LCD projector or a digital micromirror device (DMD).

In addition, the electronic apparatus 100 may be a private or industrial use display device, or a lighting device used in daily life, a sound device including a sound module, and may be implemented as a mobile communication device (e.g., smartphone), a computer device, a mobile multimedia device, a wearable device, or a home appliance. The electronic apparatus 100 according to an embodiment is not limited to the above-described device, and the electronic apparatus 100 may be implemented as an electronic apparatus 100 having at least two functions of the devices described above. For example, the electronic apparatus 100 may be utilized as a display device, a lighting device or a sound device due to the projector function being turned-off, the lighting function or the speaker function being turned-on according to the operation of the processor, and include a microphone or a communication device and utilized as an AI speaker.

The main body 105 may be a housing forming the exterior, and may support or protect configuration components (e.g., configuration illustrated in FIG. 11) of the electronic apparatus 100 which is provided inside of the main body 105. A shape of the main body 105 may have a structure close to cylinder as illustrated in FIG. 12. However, the shape of the main body 105 is not limited thereto, and according to various embodiments, the main body 105 may be implemented to various geometric shapes such as a column having polygonal cross-sections, a cone, and a sphere.

The size of the main body 105 may be a size which can be grasped or moved with one hand by the user, and may be implemented to a subminiature size to be portable, and may be implemented to a size capable of being placed on a table or of being coupled to a lighting device.

The main body 105 may be made of a material, such as a matt metal or a synthetic resin so that the user fingerprint or dust is not left, or the exterior of the main body 105 may be formed of a smooth gloss.

In the main body 105, a friction area may be formed for the user to grasp and move at a part of the area at the exterior of the main body 105. Alternatively, the main body 105 may be provided with a grasping part which is bent for the user to grasp or a support to at least a part of the area.

The projection lens 109 may be formed at one surface of the main body 105, and formed so that light which passed a lens array is projected to the outside of the main body 105. The projection lens 109 of various embodiments may be an optical lens which is coated at low-dispersion to reduce chromatic aberration. The projection lens 109 may be a convex lens or a condensing lens, and the projection lens 109 according to the embodiment may adjust the focal point by adjusting positions of a plurality of sub lenses.

The head 103 may be provided to be coupled to one surface of the main body 105 and support and protect the projection lens 109. The head 103 may be coupled with the main body 105 to be swivelable from a pre-set angle range based on a surface of the main body 105. That is, the head 103 may be able to swivel with respect to the main body 105.

The head 103 may be swiveled automatically or manually by the user or the processor and freely adjust the projection angle of the projection lens 109. Alternatively, although not illustrated in the drawings, the head 103 may be coupled with the main body 105 and include a neck which is extendable from the main body 105, and the head 103 may adjust the projection angle of the projection lens 109 by being tilted or inclined.

Based on the electronic apparatus 100 adjusting the direction of the head 103 while the position and the angle of the main body 105 is in a fixed state and adjusting the output angle of the projection lens 109, light or the image may be projected to a desired location. In addition, the head 103 may include a handle for the user to hold after rotating to a desired direction.

At the outer circumferential surface of the main body 105, a plurality of openings may be formed. An audio output from the audio outputter may be output to the outside of the main body 105 of the electronic apparatus 100 through the plurality of openings. The audio outputter may include a speaker, and the speaker may be used for general use, such as, for example, and without limitation, playing back multimedia or playing back recordings, voice output, and the like.

According to an embodiment, a heat dissipation fan may be provided inside of the main body 105, and when the heat dissipation fan is operated, air or heat inside of the main body 105 may be discharged through the plurality of openings. Accordingly, the electronic apparatus 100 may discharge heat generated by the operation of the electronic apparatus 100 to the outside, and the electronic apparatus 100 may be prevented from being overheated.

The connector 111 may transmit or receive electrical signals by connecting the electronic apparatus 100 with the external device, or receive power from the outside. According to an embodiment, the connector 111 may be physically connected with the external device. At this time, the connector 111 may be included with an input and output interface, and communication with the external device may be connected or power may be received through wired or wireless means. For example, the connector 111 may include a HDMI connection terminal, a USB connection terminal, a SD card receiving groove, an audio connection terminal or an electrical outlet, or a Bluetooth, Wi-Fi, or a wireless charging connection module may be included which connects wirelessly with the external device.

In addition, the connector 111 may be configured with a socket structure which is connected to the external lighting device, and receive power by being connected to the socket receiving groove of the external lighting device. The size and dimension of the connector 111 of the socket structure may be various implemented taking into consideration the receiving structure of the external device which is couplable to the electronic apparatus 100. For example, based on an international standard E26, a diameter of a joining part of the connector 111 may be implemented as 26 mm, and in this case, the electronic apparatus 100 may replace a commonly used lightbulb and may be coupled to the external lighting device such as a stand. When fastening to an existing socket located at the ceiling, the electronic apparatus 100 may be a structure which is projected from the top to the bottom, and when the electronic apparatus 100 is not rotated due to the socket coupling, it may also not be possible to rotate the screen image. Accordingly, even if power is supplied by being socket coupled, the electronic apparatus 100 may output the screen image or rotate the screen image to a desired location as the head 103 is swiveled from one surface of the main body 105 and the output angle is adjusted in the socket coupled state at a stand of the ceiling so that the electronic apparatus 100 is rotatable.

The connector 111 may include a coupling sensor, the coupling sensor may sense whether the connector 111 and the external device is coupled, the coupled state, or a subject for coupling and transfer to the processor, and the processor may control the operation of the electronic apparatus 100 based on the received sensing value.

The cover 107 may be coupled to and separated from the main body 105, and protect the connector 111 so that the connector 111 is not constantly exposed to the outside. The shape of the cover 107 may be in a shape of a series with the main body as illustrated in FIG. 12, or implemented to correspond to the shape of the connector 111. The cover 107 may support the electronic apparatus 100, and the electronic apparatus 100 may be used coupled to or placed in an external holder by being coupled to the cover 107.

The electronic apparatus 100 of various embodiments may be provided with a battery inside the cover 107. The battery may include, for example, a non-rechargeable primary battery, a rechargeable secondary battery, or a fuel cell.

Although not illustrated in the drawings, the electronic apparatus 100 may include a camera module, and the camera module may capture a still image and a motion image. According to an embodiment, the camera module may include at least one lens, image sensor, image signal processor, or a flash.

Although not illustrated in the drawings, the electronic apparatus 100 may include a protection case to protect and easily transport the electronic apparatus 100, or a stand which supports of fixes the main body 105, or a bracket which may be coupled to a wall surface or a partition.

In addition, the electronic apparatus 100 may provide various functions by being connected with various external devices using the socket structure. In an embodiment, the electronic apparatus 100 may be connected with the external camera device by using the socket structure. The electronic apparatus 100 may provide an image stored in the connected camera device or an image currently being captured by using the projector 140. In another embodiment, the electronic apparatus 100 may receive power by being connected with a battery module using the socket structure. Meanwhile, the electronic apparatus 100 may be connected with the external device using the socket structure, but this is merely one embodiment, and may be connected with the external device by using another interface (e.g., USB, etc.).

Various modifications may be made to the embodiments of the disclosure, and there may be various types of embodiments. Accordingly, specific embodiments will be illustrated in drawings, and the embodiments will be described in detail in the detailed description. However, it should be noted that the various embodiments are not for limiting the scope of the disclosure to a specific embodiment, but they should be interpreted to include all modifications, equivalents or alternatives of the embodiments disclosed herein. With respect to the description on the drawings, like reference numerals may be used to indicate like elements.

In describing the disclosure, in case it is determined that the detailed description of related known technologies may unnecessarily confuse the gist of the disclosure, the detailed description thereof will be omitted.

Further, the embodiments described above may be modified to various different forms, and it is to be understood that the scope of the technical spirit of the disclosure is not limited to the embodiments described above. Rather, the embodiments are provided so that the disclosure will be thorough and complete, and to fully convey the technical spirit of the disclosure to those skilled in the art.

The terms used in the disclosure are merely used to describe a specific embodiment, and is not intended to limit the scope of protection. A singular expression includes a plural expression, unless otherwise specified.

In the disclosure, expressions such as "comprise," "may comprise," "include," "may include," or the like are used to designate a presence of a corresponding characteristic (e.g., elements such as numerical value, function, operation, or component, etc.), and not to preclude a presence or a possibility of additional characteristics.

In the disclosure, expressions such as "A or B," "at least one of A and/or B," or "one or more of A and/or B" may include all possible combinations of the items listed together. For example, "A or B," "at least one of A and B," or "at least one of A or B" may refer to all cases including (1) at least one A, (2) at least one B, or (3) both of at least one A and at least one B.

Expressions such as "first," "second," "1st," "2nd," and so on used herein may be used to refer to various elements regardless of order and/or importance, and it should be noted that the expressions are merely used to distinguish an element from another element and not to limit the relevant elements.

When a certain element (e.g., first element) is indicated as being "(operatively or communicatively) coupled with/to" or "connected to" another element (e.g., second element), it may be understood as the certain element being directly coupled with/to another element or as being coupled through other element (e.g., third element).

On the other hand, when a certain element (e.g., first element) is indicated as "directly coupled with/to" or "directly connected to" another element (e.g., second element), it may be understood as the other element (e.g., third element) not being present between the certain element and another element.

The expression "configured to . . . (or set up to)" used in the disclosure may be used interchangeably with, for example, "suitable for . . . ," "having the capacity to . . . ," "designed to . . . ," "adapted to . . . ," "made to . . . ," or "capable of . . . " based on circumstance. The term "configured to . . . (or set up to)" may not necessarily mean "specifically designed to" in terms of hardware.

Rather, in a certain circumstance, the expression "a device configured to . . . " may mean something that the device "may perform . . . " together with another device or components. For example, the phrase "a processor configured to (or set up to) perform A, B, or C" may mean a dedicated processor for performing a corresponding operation (e.g., embedded processor), or a generic-purpose processor (e.g., a central processing unit (CPU) or an application processor) capable of performing the corresponding operations by executing one or more software programs stored in a memory device.

The terms "module" or "part" used in the embodiments herein perform at least one function or operation, and may be implemented with a hardware or software, or a combination of hardware and software. Further, a plurality of "modules" or a plurality of "parts", except for a "module" or a "part" which needs to be implemented to a specific hardware, may be integrated to at least one module and implemented in at least one processor.

Various elements and areas in the drawings have been schematically illustrated. Accordingly, the technical spirit of the disclosure is not limited by the relative scale or distance illustrated in the accompanied drawings.

The various embodiments described above may be implemented in a recordable medium which is readable by a computer or a device similar to the computer using software, hardware, or the combination of software and hardware. According to a hardware implementation, the embodiments of the disclosure may be implemented using at least one from among application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or electric units for performing other functions. In some cases, embodiments described herein may be implemented by the processor itself. According to a software implementation, embodiments such as the procedures and functions described herein may be implemented with separate software modules. The respective software modules described above may perform one or more functions and operations described herein.

A method according to the various embodiments of the disclosure described above may be stored in a non-transitory readable medium. The non-transitory readable medium may be used mounted to various devices.

The non-transitory computer readable medium may refer to a medium that stores data semi-permanently rather than storing data for a very short time, such as a register, a cache, a memory, or the like, and is readable by a device. Specifically, programs for performing the various methods described above may be stored and provided in the non-transitory computer readable medium such as, for example, and without limitation, a compact disc (CD), a digital versatile disc (DVD), a hard disc, a Blu-ray disc, a USB, a memory card, a ROM, and the like.

According to an embodiment, a method according to one or more embodiments may be provided included a computer program product. The computer program product may be exchanged between a seller and a purchaser as a commodity. The computer program product may be distributed in the form of a machine-readable storage medium (e.g., a compact disc read only memory (CD-ROM)), or distributed online through an application store (e.g., PLAYSTORE™). In the case of online distribution, at least a portion of the computer program product may be at least stored temporarily in a storage medium such as a server of a manufacturer, a server of an application store, or a memory of a relay server, or temporarily generated.

In the above, while the disclosure has been illustrated and described with reference to various example embodiments thereof, it will be understood that the various example embodiments are intended to be illustrative, not limiting. It will be understood by those skilled in the art that various changes in form and details may be made therein without departing from the true spirit and full scope of the disclosure, including the appended claims and their equivalents.

What is claimed is:

1. A control method of an electronic apparatus, the method comprising:
   identifying whether an external device is located within a reference radius of the electronic apparatus;
   based on the external device being located within the reference radius, obtaining distance information between the identified external device and the electronic apparatus;
   identifying a standby time based on the distance information; and
   based on the standby time elapsing, performing connection with the external device,
   wherein the standby time indicates a period of time from a first time at which the external device is identified to a second time at which the connection with the external device begins.

2. The control method of claim 1, wherein the identifying the standby time comprises:
   based on the distance information indicating that a distance between the electronic apparatus and the external device is a first distance, identifying a first period time as the standby time; and
   based on the distance information indicating that the distance between the electronic apparatus and the external device is a second distance, which is greater than the first distance, identifying a second period time longer than the first time as the standby time.

3. The control method of claim 1, wherein the identifying the standby time comprises:
   based on the distance information indicating that a distance between the electronic apparatus and the external device is a first distance, identifying a first time as the standby time;
   increasing the first time based on an increased distance between the electronic apparatus and the external device, such that the electronic apparatus and the external device become farther apart than the first distance; and
   decreasing the first time based on a decreased distance between the electronic apparatus and the external device, such that the electronic apparatus and the external device become becoming closer than the first distance.

4. The control method of claim 3, further comprising:
   based on the increased distance between the electronic apparatus and the external device becoming farther apart by the reference radius or more, controlling to not perform the connection with the external device.

5. The control method of claim 1, wherein the performing the connection with the external device comprises:
   based on the external device being located within the reference radius, controlling a projector to project information corresponding to the standby time.

6. The control method of claim 5, further comprising:
   based on the increased distance between the external device and the electronic apparatus, controlling the projector to project information notifying that the standby time for performing the connection with the external device is increased; and
   based on a decreased distance between the external device and the electronic apparatus, controlling the projector to project information notifying that the standby time for performing the connection with the external device is decreased.

7. The control method of claim 1, wherein the identifying the external device comprises:
   identifying a plurality of external devices located within the reference radius; and
   identifying one of the plurality of external devices, which is closest to the electronic apparatus as the external device to perform the connection with the electronic apparatus.

8. The control method of claim 1, wherein the identifying the external device comprises:
   identifying a plurality of external devices located within the reference radius; and
   identifying one of the plurality of external devices with a history of having performed connection with the electronic apparatus as the external device to perform the connection with the electronic apparatus.

9. The control method of claim 1, wherein the identifying the external device comprises identifying the external device located within the reference radius with the electronic apparatus through a Bluetooth Low Energy (BLE) method.

10. The control method of claim 1, wherein the obtaining the distance information comprises obtaining, by using at least one from among a Bluetooth Low Energy (BLE) method and a Time of Flight (ToF) sensor, the distance information between the identified external device and the electronic apparatus.

11. An electronic apparatus comprising:
   a memory configured to store at least one instruction;
   a communication interface; and
   a processor configured to execute the at least one instruction to:

identify whether an external device is located within a reference radius of the electronic apparatus, based on the external device being located within the reference radius, obtain distance information between the identified external device and the electronic apparatus, identify a standby time based on the distance information, and based on the standby time elapsing, control the communication interface to perform connection with the external device, wherein the standby time indicates a period of time from a first time at which the external device is identified to a second time at which the connection with the external device begins.

12. The electronic apparatus of claim 11, wherein the processor is further configured to execute the at least one instruction to:

based on the distance information indicating that a distance between the electronic apparatus and the external device is a first distance, identify a first period time as the standby time, and based on the distance information indicating that the distance between the electronic apparatus and the external device is a second distance, which is greater than the first distance, identify a second period time longer than the first time as the standby time.

13. The electronic apparatus of claim 11, wherein the processor is further configured to execute the at least one instruction to:

based on the distance information indicating that a distance between the electronic apparatus and the external device is a first distance, identify a first time as the standby time, increase the first time based on an increased distance between the electronic apparatus and the external device, such that the electronic apparatus and the external device become farther apart than the first distance, and decrease the first time based on a decreased distance between the electronic apparatus and the external device, such that the electronic apparatus and the external device become becoming closer than the first distance.

14. The electronic apparatus of claim 13, wherein the processor is further configured to execute the at least one instruction to, based on the increased distance between the electronic apparatus and the external device becoming farther apart by the reference radius or more, control the communication interface to not perform the connection with the external device.

15. The electronic apparatus of claim 11, further comprising:

a projector configured to project a projection image, wherein the processor is further configured to execute the at least one instruction to, based on the external device being located within the reference radius, control the projector to project information corresponding to the standby time.

16. The control method of claim 1, wherein the standby time is a variable time that changes after the external device is identified and before the beginning of the connection with the external device.

* * * * *